(12) United States Patent
Shrivastava et al.

(10) Patent No.: US 10,859,983 B2
(45) Date of Patent: Dec. 8, 2020

(54) MONITORING SITES CONTAINING SWITCHABLE OPTICAL DEVICES AND CONTROLLERS

(71) Applicant: View, Inc., Milpitas, CA (US)

(72) Inventors: Dhairya Shrivastava, Los Altos, CA (US); Stephen C. Brown, San Mateo, CA (US); Vijay Mani, San Jose, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/123,069

(22) PCT Filed: Mar. 5, 2015

(86) PCT No.: PCT/US2015/019031
§ 371 (c)(1),
(2) Date: Sep. 1, 2016

(87) PCT Pub. No.: WO2015/134789
PCT Pub. Date: Sep. 11, 2015

(65) Prior Publication Data
US 2017/0075323 A1    Mar. 16, 2017

Related U.S. Application Data

(60) Provisional application No. 61/948,464, filed on Mar. 5, 2014, provisional application No. 61/974,677, filed on Apr. 3, 2014.

(51) Int. Cl.
*E06B 9/24* (2006.01)
*G05B 13/02* (2006.01)
(Continued)

(52) U.S. Cl.
CPC ............ *G05B 13/0265* (2013.01); *E06B 9/24* (2013.01); *G02F 1/163* (2013.01); *G06Q 10/06* (2013.01);
(Continued)

(58) Field of Classification Search
None
See application file for complete search history.

(56) References Cited

U.S. PATENT DOCUMENTS 4,129,861 A    12/1978  Giglia
4,553,085 A    11/1985  Canzano
(Continued)

FOREIGN PATENT DOCUMENTS

CN    1311935 A    9/2001
CN    1692348 A    11/2005
(Continued)

OTHER PUBLICATIONS

U.S. Final Office Action dated Jan. 27, 2014 in U.S. Appl. No. 13/479,137.
(Continued)

*Primary Examiner* — Issac T Tecklu
(74) *Attorney, Agent, or Firm* — Weaver Austin Villeneuve & Sampson LLP; Brian D. Griedel

(57) ABSTRACT

A site monitoring system may analyze information from sites to determine when a device, a sensor, a controller or other structure associated with optically switchable devices has a problem. The system may, if appropriate, act on the problem. In certain embodiments, the system learns customer/user preferences and adapts its control logic to meet the customer's goals.

29 Claims, 31 Drawing Sheets

(51) Int. Cl.
*G06Q 50/10* (2012.01)
*G06Q 10/06* (2012.01)
*G02F 1/163* (2006.01)

(52) U.S. Cl.
CPC ...... *G06Q 50/10* (2013.01); *E06B 2009/2464* (2013.01); *Y02P 90/84* (2015.11)

(56) References Cited

U.S. PATENT DOCUMENTS

| | | | |
|---|---|---|---|
| 5,384,653 A | 1/1995 | Benson et al. | |
| 5,416,617 A | 5/1995 | Loiseaux et al. | |
| 5,477,152 A | 12/1995 | Hayhurst | |
| 5,579,149 A * | 11/1996 | Moret | G02B 26/0833 345/109 |
| 6,039,390 A | 3/2000 | Agrawal et al. | |
| 6,055,089 A | 4/2000 | Schulz et al. | |
| 6,262,831 B1 | 7/2001 | Bauer et al. | |
| 6,344,748 B1 | 2/2002 | Gannon | |
| 6,407,847 B1 | 6/2002 | Poll et al. | |
| 6,567,708 B1 | 5/2003 | Bechtel et al. | |
| 6,707,590 B1 | 3/2004 | Bartsch | |
| 6,897,936 B1 | 5/2005 | Li et al. | |
| 6,965,813 B2 | 11/2005 | Granqvist et al. | |
| 7,133,181 B2 | 11/2006 | Greer | |
| 7,684,105 B2 * | 3/2010 | Lamontagne | E06B 9/24 359/290 |
| 7,800,812 B2 | 9/2010 | Moskowitz | |
| 7,941,245 B1 | 5/2011 | Popat | |
| 8,149,756 B2 | 4/2012 | Hottinen | |
| 8,254,013 B2 | 8/2012 | Mehtani et al. | |
| 8,705,162 B2 | 4/2014 | Brown et al. | |
| 8,843,238 B2 | 9/2014 | Wenzel et al. | |
| 8,976,440 B2 | 3/2015 | Berland et al. | |
| 9,081,246 B2 | 7/2015 | Rozbicki | |
| 9,128,346 B2 | 9/2015 | Shrivastava et al. | |
| 9,170,008 B2 | 10/2015 | Reul et al. | |
| 9,300,581 B1 | 3/2016 | Hui et al. | |
| 9,442,338 B2 | 9/2016 | Uhm et al. | |
| 9,442,341 B2 | 9/2016 | Shrivastava et al. | |
| 9,470,947 B2 | 10/2016 | Nagel et al. | |
| 9,677,327 B1 | 6/2017 | Nagel et al. | |
| 9,690,174 B2 | 6/2017 | Wang | |
| 9,709,869 B2 | 7/2017 | Baumann et al. | |
| 9,740,074 B2 | 8/2017 | Agrawal et al. | |
| 9,778,533 B2 | 10/2017 | Bertolini | |
| 9,946,138 B2 | 4/2018 | Shrivastava et al. | |
| 10,001,691 B2 | 6/2018 | Shrivastava et al. | |
| 10,137,764 B2 | 11/2018 | Driscoll et al. | |
| 10,268,098 B2 | 4/2019 | Shrivastava et al. | |
| 10,303,035 B2 | 5/2019 | Brown et al. | |
| 10,387,221 B2 | 8/2019 | Shrivastava et al. | |
| 10,409,652 B2 | 9/2019 | Shrivastava et al. | |
| 10,481,459 B2 | 11/2019 | Shrivastava et al. | |
| 10,514,963 B2 | 12/2019 | Shrivastava et al. | |
| 2002/0027504 A1 * | 3/2002 | Davis | G01D 4/004 340/540 |
| 2002/0149829 A1 | 10/2002 | Mochizuka et al. | |
| 2003/0169574 A1 | 9/2003 | Maruyama et al. | |
| 2003/0191546 A1 | 10/2003 | Bechtel et al. | |
| 2003/0227663 A1 | 12/2003 | Agrawal et al. | |
| 2004/0215520 A1 * | 10/2004 | Butler | G05B 23/0213 705/22 |
| 2005/0270620 A1 | 12/2005 | Bauer et al. | |
| 2005/0270621 A1 | 12/2005 | Bauer et al. | |
| 2006/0018000 A1 | 1/2006 | Greer | |
| 2006/0107616 A1 | 5/2006 | Ratti et al. | |
| 2006/0279527 A1 | 12/2006 | Zehner et al. | |
| 2007/0053053 A1 | 3/2007 | Moskowitz | |
| 2007/0067048 A1 | 3/2007 | Bechtel et al. | |
| 2007/0285759 A1 | 12/2007 | Ash et al. | |
| 2008/0043316 A2 * | 2/2008 | Moskowitz | E06B 9/24 359/296 |
| 2008/0186562 A2 | 8/2008 | Moskowitz | |
| 2008/0211682 A1 | 9/2008 | Hyland et al. | |
| 2009/0271042 A1 | 10/2009 | Voysey | |
| 2009/0323160 A1 | 12/2009 | Egerton et al. | |
| 2010/0039410 A1 | 2/2010 | Becker et al. | |
| 2010/0188057 A1 | 7/2010 | Tarng | |
| 2010/0228854 A1 * | 9/2010 | Morrison | H04L 29/00 709/224 |
| 2010/0243427 A1 | 9/2010 | Kozlowski et al. | |
| 2010/0245973 A1 | 9/2010 | Wang et al. | |
| 2010/0274366 A1 * | 10/2010 | Fata | G05B 15/02 700/7 |
| 2010/0315693 A1 | 12/2010 | Lam et al. | |
| 2011/0071685 A1 | 3/2011 | Huneycutt et al. | |
| 2011/0097081 A1 * | 4/2011 | Gupta | H04J 14/029 398/38 |
| 2011/0148218 A1 | 6/2011 | Rozbicki | |
| 2011/0164317 A1 | 7/2011 | Verghol et al. | |
| 2012/0026573 A1 | 2/2012 | Collins et al. | |
| 2012/0033287 A1 * | 2/2012 | Friedman | C03C 17/34 359/275 |
| 2012/0062975 A1 * | 3/2012 | Mehtani | G02F 1/163 359/265 |
| 2012/0086363 A1 | 4/2012 | Golding et al. | |
| 2012/0140492 A1 | 6/2012 | Alvarez | |
| 2012/0188627 A1 | 7/2012 | Chen et al. | |
| 2012/0190386 A1 | 7/2012 | Anderson | |
| 2012/0194895 A1 | 8/2012 | Podbelski et al. | |
| 2012/0235493 A1 | 9/2012 | Kiuchi et al. | |
| 2012/0239209 A1 | 9/2012 | Brown et al. | |
| 2012/0259583 A1 | 10/2012 | Noboa et al. | |
| 2012/0293855 A1 * | 11/2012 | Shrivastava | E06B 9/24 359/275 |
| 2013/0060357 A1 | 3/2013 | Li et al. | |
| 2013/0085614 A1 | 4/2013 | Wenzel et al. | |
| 2013/0085615 A1 | 4/2013 | Barker | |
| 2013/0085616 A1 | 4/2013 | Wenzel et al. | |
| 2013/0131869 A1 | 5/2013 | Majewski et al. | |
| 2013/0157493 A1 | 6/2013 | Brown | |
| 2013/0196600 A1 * | 8/2013 | Capers | H04W 24/06 455/41.2 |
| 2013/0241299 A1 | 9/2013 | Snyker et al. | |
| 2013/0271812 A1 * | 10/2013 | Brown | G02F 1/1523 359/275 |
| 2013/0271813 A1 * | 10/2013 | Brown | G02F 1/163 359/275 |
| 2013/0271814 A1 * | 10/2013 | Brown | G02F 1/163 359/275 |
| 2013/0278989 A1 | 10/2013 | Lam et al. | |
| 2014/0156097 A1 | 6/2014 | Nesler et al. | |
| 2014/0160550 A1 | 6/2014 | Brown et al. | |
| 2014/0170863 A1 | 6/2014 | Brown | |
| 2014/0236323 A1 * | 8/2014 | Brown | G02F 1/163 700/90 |
| 2014/0303788 A1 | 10/2014 | Sanders et al. | |
| 2014/0330538 A1 | 11/2014 | Conklin et al. | |
| 2014/0347190 A1 * | 11/2014 | Grimm | F16P 3/08 340/815.4 |
| 2014/0349497 A1 * | 11/2014 | Brown | H01R 41/00 439/110 |
| 2014/0368899 A1 | 12/2014 | Greer | |
| 2015/0003822 A1 * | 1/2015 | Fukada | H04B 10/032 398/2 |
| 2015/0023661 A1 * | 1/2015 | Borkenhagen | H04Q 11/0005 398/45 |
| 2015/0116811 A1 | 4/2015 | Shrivastava et al. | |
| 2015/0120297 A1 | 4/2015 | Meruva | |
| 2015/0160525 A1 | 6/2015 | Shi | |
| 2015/0378230 A1 | 12/2015 | Gudmunson et al. | |
| 2015/0378231 A1 | 12/2015 | Greer et al. | |
| 2016/0070151 A1 | 3/2016 | Shrivastava et al. | |
| 2016/0109778 A1 | 4/2016 | Shrivastava et al. | |
| 2016/0134932 A1 | 5/2016 | Karp et al. | |
| 2016/0154290 A1 | 6/2016 | Brown et al. | |
| 2016/0202589 A1 | 7/2016 | Nagel et al. | |
| 2017/0082903 A1 | 3/2017 | Vigano et al. | |
| 2017/0097259 A1 | 4/2017 | Brown et al. | |
| 2017/0139301 A1 | 5/2017 | Messere et al. | |
| 2017/0197494 A1 | 7/2017 | Li | |
| 2017/0200424 A1 | 7/2017 | Xu et al. | |

(56) References Cited

U.S. PATENT DOCUMENTS

| | | | |
|---|---|---|---|
| 2017/0212400 | A1 | 7/2017 | Shrivastava et al. |
| 2017/0234067 | A1 | 8/2017 | Fasi et al. |
| 2017/0253801 | A1 | 9/2017 | Bae et al. |
| 2017/0279930 | A1 | 9/2017 | Zhang |
| 2017/0285432 | A1 | 10/2017 | Shrivastava et al. |
| 2017/0285433 | A1 | 10/2017 | Shrivastava et al. |
| 2017/0347129 | A1 | 11/2017 | Levi et al. |
| 2017/0364395 | A1 | 12/2017 | Shrivastava et al. |
| 2018/0090992 | A1 | 3/2018 | Shrivastava et al. |
| 2018/0129172 | A1 | 5/2018 | Shrivastava et al. |
| 2018/0144712 | A1 | 5/2018 | Threlkel et al. |
| 2018/0189117 | A1 | 7/2018 | Shrivastava et al. |
| 2018/0267380 | A1 | 9/2018 | Shrivastava et al. |
| 2018/0284555 | A1 | 10/2018 | Klawuhn et al. |
| 2019/0155122 | A1 | 5/2019 | Brown et al. |
| 2019/0235451 | A1 | 8/2019 | Shrivastava et al. |
| 2019/0271895 | A1 | 9/2019 | Shrivastava et al. |
| 2019/0331978 | A1 | 10/2019 | Shrivastava et al. |
| 2019/0347141 | A1 | 11/2019 | Shrivastava et al. |
| 2019/0353972 | A1 | 11/2019 | Shrivastava et al. |
| 2019/0384652 | A1 | 12/2019 | Shrivastava et al. |
| 2020/0041963 | A1 | 2/2020 | Shrivastava et al. |
| 2020/0041967 | A1 | 2/2020 | Shrivastava et al. |
| 2020/0057421 | A1 | 2/2020 | Trikha et al. |

FOREIGN PATENT DOCUMENTS

| | | | | |
|---|---|---|---|---|
| CN | 101510078 | A | 8/2009 | |
| CN | 102598469 | A | 7/2012 | |
| CN | 103327126 | A | 9/2013 | |
| CN | 103547965 | A | 1/2014 | |
| CN | 103649826 | A | 3/2014 | |
| EP | 1929701 | A0 | 6/2008 | |
| EP | 2357544 | | 8/2011 | |
| EP | 2648086 | A2 | 10/2013 | |
| EP | 2764998 | A1 | 8/2014 | |
| EP | 3015915 | A1 | 5/2016 | |
| EP | 3293941 | A1 | 3/2018 | |
| EP | 3352053 | A1 | 7/2018 | |
| JP | H10-215492 | A | 8/1998 | |
| JP | 2003-284160 | A | 10/2003 | |
| JP | 2007-156909 | A | 6/2007 | |
| KR | 10-2012-0045915 | | 5/2012 | |
| KR | 10-2014-0004175 | A | 1/2014 | |
| KR | 10-1346862 | B | 1/2014 | |
| KR | 10-1799323 | B1 | 11/2017 | |
| RU | 104808 | U1 | 5/2011 | |
| RU | 2012107324 | A | 9/2013 | |
| TW | 200532346 | A | 10/2005 | |
| WO | WO2012/079159 | | 6/2012 | |
| WO | WO2013/155467 | | 10/2013 | |
| WO | WO-2013155467 | A1 * | 10/2013 | ............. G08C 17/02 |
| WO | WO2013/177575 | A1 | 11/2013 | |
| WO | WO2014/082092 | | 5/2014 | |
| WO | WO2014/121809 | | 8/2014 | |
| WO | WO2014/130471 | | 8/2014 | |
| WO | WO2015/051262 | A1 | 4/2015 | |
| WO | WO2015/134789 | | 9/2015 | |
| WO | WO2016/004109 | | 1/2016 | |
| WO | WO2016/085964 | | 6/2016 | |
| WO | WO2016/094445 | | 6/2016 | |
| WO | WO2016/183059 | A1 | 11/2016 | |
| WO | WO2017-007841 | A1 | 1/2017 | |
| WO | WO2017/075059 | | 5/2017 | |
| WO | WO2017/189618 | A1 | 11/2017 | |
| WO | WO2018/200702 | A1 | 11/2018 | |
| WO | WO2018/200740 | A1 | 11/2018 | |
| WO | WO2018/200752 | A1 | 11/2018 | |
| WO | WO2019/203931 | | 10/2019 | |

OTHER PUBLICATIONS

U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Sep. 23, 2013 in U.S. Appl. No. 13/479,137.
U.S. Office Action dated Jul. 3, 2014 in U.S. Appl. No. 13/479,137.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Office Action dated Mar. 25, 2016 in U.S. Appl. No. 14/887,178.
U.S. Office Action dated Oct. 23, 2017 in U.S. Appl. No. 14/887,178.
U.S. Office Action dated Sep. 11, 2017 in U.S. Appl. No. 14/951,410.
International Preliminary Report on Patentability dated Jun. 8, 2017 in PCT/US2015/062480.
International Search Report and Written Opinion dated Feb. 15, 2016 in PCT/US2015/062480.
EP Extended Search Report dated Jun. 19, 2017 in EP Application No. 15758538.1.
International Preliminary Report on Patentability dated Sep. 15, 2016 in Application No. PCT/US2015/019031.
International Preliminary Report on Patentability dated Jan. 12, 2017 in PCT Application No. PCT/US15/38667.
International Search Report and Written Opinion dated Oct. 16, 2015 in PCT Application No. PCT/US15/38667.
International Preliminary Report on Patentability dated Jun. 22, 2017 in PCT Application No. PCT/US15/64555.
International Search Report and Written Opinion dated Oct. 16, 2015 in PCT Application No. PCT/US15/64555.
APC by Schneider Electric, Smart-UPS 120V Product Brochure, 2013, 8 pp.
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
U.S. Appl. No. 15/691,468, filed Aug. 30, 2017, Shrivastava et al.
International Search Report and Written Opinion dated May 29, 2015 in Application No. PCT/US2015/019031.
U.S. Notice of Allowance dated Mar. 9, 2018 in U.S. Appl. No. 14/887,178.
U.S. Final Office Action dated Mar. 15, 2018 in U.S. Appl. No. 14/951,410.
EP Extended Search Report dated Feb. 15, 2018 in EP Application No. 15814233.1.
U.S. Appl. No. 15/910,925, filed Mar. 2, 2018, Brown et al.
U.S. Office Action dated Jul. 24, 2018 in U.S. Appl. No. 15/978,029.
U.S. Office Action dated Sep. 4, 2018 in U.S. Appl. No. 15/320,725.
U.S. Office Action dated Jul. 6, 2018 in U.S. Appl. No. 15/534,175.
U.S. Office Action dated Aug. 7, 2018 in U.S. Appl. No. 15/910,936.
U.S. Notice of Allowance dated Oct. 22, 2018 in U.S. Appl. No. 14/951,410.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
CN Office Action dated Aug. 28, 2018 in CN Application No. 201580070776.3.
EP Extended Search Report dated Nov. 8, 2018 in EP Application No. 15863112.7.

(56) References Cited

OTHER PUBLICATIONS

EP Office Action dated Aug. 21, 2018 in EP Application No. 15758538.1.
EP Extended Search Report dated Jun. 5, 2018 in EP Application No. 15868003.3.
RU Office Action dated Sep. 24, 2018 in Ru Application No. 2016139012.
U.S. Notice of Allowance dated Dec. 13, 2018 in U.S. Appl. No. 15/978,029.
U.S. Office Action dated Feb. 7, 2019 in U.S. Appl. No. 15/623,237.
U.S. Office Action dated Feb. 7, 2019 in U.S. Appl. No. 15/691,468.
U.S. Final Office Action dated Jan. 31, 2019 in U.S. Appl. No. 15/534,175.
U.S. Notice of Allowance dated Dec. 14, 2018 in U.S. Appl. No. 15/910,936.
Taiwanese Office Action dated Dec. 12, 2018 in TW Application No. 107129150.
U.S. Appl. No. 16/253,971, filed Jan. 22, 2019, Brown et al.
U.S. Appl. No. 16/254,434, filed Jan. 22, 2019, Brown et al.
U.S. Office Action dated Aug. 22, 2019 in U.S. Appl. No. 16/298,776.
U.S. Office Action dated Aug. 21, 2019 in U.S. Appl. No. 16/508,099.
U.S. Office Action dated Jul. 25, 2019 in U.S. Appl. No. 16/253,971.
U.S. Final Office Action dated Jul. 3, 2019 in U.S. Appl. No. 15/623,237.
U.S. Final Office Action dated Jul. 2, 2019 in U.S. Appl. No. 15/691,468.
U.S. Notice of Allowance dated Mar. 20, 2019 in U.S. Appl. No. 15/320,725.
U.S. Notice of Allowance (corrected) dated Apr. 18, 2019 in U.S. Appl. No. 15/320,725.
U.S. Notice of Allowance dated Jul. 17, 2019 in U.S. Appl. No. 15/320,725.
U.S. Notice of Allowance dated Apr. 17, 2019 in U.S. Appl. No. 15/534,175.
U.S. Notice of Allowance dated Jul. 25, 2019 in U.S. Appl. No. 15/534,175.
U.S. Office Action dated Feb. 4, 2019 in U.S. Appl. No. 15/623,235.
U.S. Notice of Allowance dated May 14, 2019 in U.S. Appl. No. 15/623,235.
U.S. Notice of Allowance dated Apr. 17, 2019 in U.S. Appl. No. 15/910,936.
CN Office Action dated Mar. 19, 2019 in CN Application No. 201580070776.3.
CN Office Action dated Feb. 2, 2019 in CN Application No. 201580015979.2.
CN Office Action dated Aug. 16, 2019 in CN Application No. 201580015979.2.
EP Examination Report dated Mar. 4, 2019 in EP Application No. 15814233.1.
Russian Office Action dated Jul. 10, 20019 in RU Application No. 2017123902.
International Preliminary Report on Patentability dated Apr. 18, 2019 in PCT Application No. PCT/US17/54120.
International Search Report and Written Opinion (ISA/KR) dated Jan. 9, 2018 in PCT Application No. PCT/US17/54120.
Taiwanese Office Action dated May 13, 2019 in TW Application No. 104139217.
U.S. Appl. No. 16/338,403, filed Mar. 29, 2019, Shrivastava et al.
U.S. Appl. No. 16/508,099, filed Jul. 10, 2019, Shrivastava et al.
U.S. Appl. No. 16/523,624, filed Jul. 26, 2019, Shrivastava et al.
U.S. Appl. No. 16/555,377, filed Aug. 29, 2019, Shrivastava et al.
International Search Report and Written Opinion dated Jul. 11, 2019 in PCT Application No. PCT/US2019/030467.
U.S. Final Office Action dated Mar. 3, 2020 in U.S. Appl. No. 16/508,099.
U.S. Final Office Action dated Mar. 18, 2020 in U.S. Appl. No. 16/253,971.
U.S. Preliminary Amendment dated Dec. 31, 2019 in U.S. Appl. No. 16/608,159.
CN Office Action dated Oct. 9, 2019 in CN Application No. 201580070776.3.
EP Extended Search Report dated Nov. 28, 2019 in EP Application No. 19188907.0.
Australian Examination Report dated Mar. 2, 2020 in AU Application No. 2015353569.
International Search Report and Written Opinion (ISA/KR) dated Jun. 14, 2019 in PCT/U52019/019455.
EP Extended Search Report dated Dec. 17, 2019 in EP Application No.
Australian Examination Report dated Dec. 24, 2019 in AU Application No. 2015227056.
CN Office Action dated Jan. 15, 2020 in CN Application No. 201580015979.2.
CN Office Action dated Mar. 9, 2020 in CN Application No. 201580040461.4.
CN Office Action dated Feb. 3, 2020 in CN Application No. 201580072749.X.
JP Office Action dated Nov. 19, 2019 in JP Application No. 2017-549175.
International Preliminary Report on Patentability dated Nov. 7, 2019 in PCT Application No. PCT/US2018/029460.
International Preliminary Report on Patentability dated Nov. 7, 2019 in PCT Application No. PCT/US2018/029406.
U.S. Appl. No. 16/608,159, filed Oct. 24, 2019, Trikha et al.
U.S. Appl. No. 16/664,089, filed Oct. 25, 2019, Patterson et al.

\* cited by examiner

A - Direct Sunlight Penetration
B - Clear Sky Prediction
C - Real-time Irradiance accounting for obstructed and reflected

SITE STATUS DASHBOARD

| Home | New Site | Reports | About | | | view | Dynamic Glass |

| Details | Name | Status | UpdateDateTime |
|---|---|---|---|
| Details | Location_A | ○ | 2/27/2014 5:16:33 AM |
| Details | Location_B | ○ | 2/27/2014 5:16:33 AM |
| Details | Location_C | ○ | 2/27/2014 5:16:33 AM |
| Details | Location_D | ○ | 2/27/2014 5:16:33 AM |
| Details | Location_E | ○ | 2/27/2014 5:16:33 AM |
| Details | Location_F | ○ | 2/27/2014 5:16:33 AM |
| Details | Location_G | ○ | 2/27/2014 5:16:33 AM |
| Details | Location_H | ○ | 2/27/2014 5:16:33 AM |
| Details | Location_I | ● | 2/27/2014 5:16:33 AM |
| Details | Location_J | ○ | 2/27/2014 5:16:33 AM |
| Details | Location_K | ○ | 2/27/2014 5:16:33 AM |
| Details | Location_L | ○ | 2/27/2014 5:16:33 AM |
| Details | Location_M | ○ | 2/27/2014 5:16:33 AM |
| Details | Location_N | ○ | 2/27/2014 5:16:33 AM |
| Details | Location_O | ○ | 2/27/2014 5:16:33 AM |
| Details | Location_P | ○ | 2/27/2014 5:16:33 AM |
| Details | Location_Q | ○ | 2/27/2014 5:16:33 AM |
| Details | Location_R | ● | 2/27/2014 5:16:33 AM |

Site Condition Status Details:
Site Status History:
Window Controller Status Details:

*Figure 8*

Shows window response to commands issued

Compare state transitions of windows connected to different network controllers.

| ZONE # | WC# | WC ID/BAR CODE | FRAME | IGU # | W | H | SF | NOTES |
|---|---|---|---|---|---|---|---|---|
| ZONE-1 | WC1 | | FRAME-F | W1 | 54 1/8 | 68 1/8 | 25.61 | |
| | WC2 | | | W2 | 54 1/8 | 68 1/8 | 25.61 | |
| | WC3 | | | W3 | 54 1/8 | 68 1/8 | 25.61 | |
| | WC4 | | FRAME-E | W4 | 54 1/8 | 68 1/8 | 25.61 | |
| | | | | W5 | 52 5/8 | 68 1/8 | 24.90 | |
| | WC5 | | | W6 | 52 5/8 | 68 1/8 | 24.90 | |
| | | | | W7 | 52 5/8 | 68 1/8 | 24.90 | |
| | WC6 | | FRAME-D | W8 | 52 5/8 | 68 1/8 | 24.90 | |
| | | | | W9 | 52 5/8 | 68 1/8 | 24.90 | |
| | WC7 | | | W10 | 52 5/8 | 68 1/8 | 24.90 | |
| | | | | W11 | 52 5/8 | 68 1/8 | 24.90 | |
| | WC8 | | FRAME-C | W12 | 52 5/8 | 68 1/8 | 24.90 | |
| | | | | W13 | 52 5/8 | 68 1/8 | 24.90 | |
| | WC9 | | | W14 | 52 5/8 | 68 1/8 | 24.90 | |
| | | | | W15 | 52 5/8 | 68 1/8 | 24.90 | |
| | WC10 | | FRAME-B | W16 | 52 5/8 | 68 1/8 | 24.90 | |
| | | | | W17 | 52 5/8 | 68 1/8 | 24.90 | |
| | WC11 | | | W18 | 52 5/8 | 68 1/8 | 24.90 | |
| | | | | W19 | 52 5/8 | 68 1/8 | 24.90 | |
| | WC12 | | FRAME-A | W20 | 52 5/8 | 68 1/8 | 24.90 | |
| | | | | W21 | 52 9/16 | 68 1/8 | 24.87 | |
| | | | | W22 | 52 9/16 | 68 1/8 | 24.87 | |
| | | | | W23 | 52 9/16 | 68 1/8 | 24.87 | |

*Figure 18A*

MONITORING SITES CONTAINING SWITCHABLE OPTICAL DEVICES AND CONTROLLERS

CROSS-REFERENCE TO RELATED APPLICATIONS

This application claims benefit of U.S. Provisional Patent Application No. 61/948,464, filed Mar. 5, 2014, and U.S. Provisional Patent Application No. 61/974,677, filed Apr. 3, 2014, both incorporated herein by reference in their entireties and for all purposes.

BACKGROUND

Electrically tintable windows such as electrochromic window, sometimes referred to as "smart windows" have been deployed in limited installations. As such windows gain acceptance and are more widely deployed, they may require increasingly sophisticated control and monitoring systems, as there may be a large amount of data associated with smart windows. Improved techniques for managing large installations will be necessary.

SUMMARY

A site monitoring system may analyze information from sites to determine when a device, a sensor, or a controller has a problem. The system may, if appropriate, act on the problem. In certain embodiments, the system learns customer/user preferences and adapts its control logic to meet the customer's goals.

A system of one or more computers and/or other processing devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for monitoring a plurality of remote sites, each having a network of switchable optical devices, the system including: (a) a data repository configured to store data about the functioning of the switchable optical devices in said remote sites; (b) one or more interfaces for receiving data from the plurality of remote sites; and (c) logic for analyzing said data from said remote sites to identify any of the switchable optical devices, or any controllers or sensors operating in conjunction with any of the switchable optical devices, that are performing outside an expected performance region. Other embodiments of this aspect include corresponding computer systems, apparatus, and computer programs recorded on one or more computer storage devices, each configured to perform or store instructions for performing the features of the logic.

Implementations may include one or more of the following features. The system further including logic for generating a notification that a switchable optical device, or a controller or a sensor operating in conjunction with the switchable optical device, is performing outside the expected performance region. The system further including logic for (i) determining a corrective action to bring a switchable optical device, a controller, or a sensor identified by the logic for analyzing into the expected performance region, and (ii) communicating the corrective action to a remote site having the identified switchable optical device, controller, or sensor. The system where the corrective action includes modifying an algorithm for controlling the switchable optical device. The system may further include logic for (i) learning a user's preference by identifying interactions of the user with a switchable optical devices at a site, and (ii) adjusting procedures for controlling the switchable optical devices to meet the user's preference. The system may further include logic for sending data and/or control messages, over the one or more interfaces, to the sites in response to data it receives from the sites. The system may further include a dashboard designed or configured to flag sites with switchable optical device, controller, or sensor operating outside the expected performance region. The system may further include a plurality of client machines selected from the group including workstations, portable computers, and mobile computing devices, where each client machine is configured to present information about the functioning of the switchable optical devices, controllers, and/or sensors devices in any of the sites. The system may further include an application server and/or a report server configured to interface with the clients to provide application services and/or reports. The system may further include a data and event reporter, a data and event logger, and/or a data analyzer. In some implementations, the expected performance region is a defined specification. The system may further include logic for (i) determining degradation in electrical current to a switchable optical device in a site, and (ii) auto-correcting the degradation by directing a controller associated with the switchable optical device to increase the switching voltage to the switchable optical device. The system may further including logic for (i) predicting when a room of a remote site is to be occupied, and (ii) automatically adjusting a tint algorithm for a switchable optical device in the room to start tinting when the room is predicted to be occupied. The system may further including logic for (i) detecting a difference in tinting times or tinting levels for different windows having switchable optical devices in a single façade, and (ii) causing all windows in the façade to tint at the same time and/or the same tint level by auto adjusting ramping voltage parameters. The system may further include logic for providing look ahead data to a site's HVAC system and/or lighting system to thereby enabling the HVAC or lighting system to enhance occupant comfort and/or save energy. The system may further include logic for comparing energy savings from multiple sites to identify algorithms and/or device types that improve energy saving. The system may further including logic for (i) generating fingerprints of the switchable optical devices, controllers, and/or sensors of the sites during commissioning of the remote sites, and (ii) determining performance of the switchable optical devices, controllers, and/or sensors by comparing their current fingerprints against their earlier fingerprints generated during commissioning.

In some embodiments, the remote sites include residential buildings, office buildings, schools, airports, hospitals, and/or government buildings. In certain embodiments, the data about the functioning of the switchable optical devices includes voltage and/or current versus time data for the switchable optical devices. In some implementations, the time variable is associated with solar position or weather. In certain implementations, the data about the functioning of the switchable optical devices includes changes in peak current to the switchable optical devices, changes in leakage current to the switchable optical devices, change in voltage compensation required to the switchable optical devices, and changes in power consumption of the switchable optical devices.

One general aspect includes a method, implemented on a site monitoring system, for monitoring a plurality of remote sites, each having a network of switchable optical devices, the method including: (a) storing data about the functioning of the switchable optical devices in the remote sites; and (b) analyzing said data from said remote sites to identify any of the switchable optical devices, or any controllers or sensors operating in conjunction with any of the switchable optical devices, that are performing outside an expected performance region. Other embodiments of this aspect include corresponding computer systems, apparatus, and computer programs recorded on one or more computer storage devices, each configured to perform the actions of the methods.

Implementations may include one or more of the following features. The method may additionally include generating a notification that a switchable optical device, or a controller or a sensor operating in conjunction with the switchable optical device, is performing outside the expected performance region. The method may further include: (c) determining a corrective action to bring a switchable optical device, a controller, or a sensor identified by the logic for analyzing into the expected performance region; and (d) communicating said corrective action to a remote site having the identified switchable optical device, controller, or sensor. In some implementations, the corrective action includes modifying an algorithm for controlling the switchable optical device. In some cases, the method further includes: (c) learning a user's preference by identifying includent interactions of the user with a switchable optical devices at a site; and (d) adjusting procedures for controlling the switchable optical devices to meet the user's preference. The method may further include sending data and/or control message from the site monitoring system to the sites in response to data received from the sites. The method may further include generating reports about the sites using said data from said remote sites. In some implementations, the expected performance region is a defined specification.

In certain embodiments, the method further includes: (c) determining degradation in electrical current to a switchable optical device in a site; and (d) auto-correcting the degradation by directing a controller associated with the switchable optical device to increase the switching voltage to the switchable optical device. The method may further include: (c) predicting when a room of a remote site is to be occupied; and (d) automatically adjusting a tint algorithm for a switchable optical device in the room to start tinting when the room is predicted to be occupied. The method may further include: (c) detecting a difference in tinting times or tinting levels for different windows having switchable optical devices in a single faade; and (d) causing all windows in the façade to tint at the same time and/or the same tint level by auto adjusting ramping voltage parameters. The method may further include providing look ahead data to a site's HVAC system and/or lighting system to thereby enabling the HVAC or lighting system to enhance occupant comfort and/or save energy. The method may further include comparing energy savings from multiple sites to identify algorithms and/or device types that improve energy saving. The method may further include: (c) generating fingerprints of the switchable optical devices, controllers, and/or sensors of the sites during commissioning of the sites; and (d) determining performance of the switchable optical devices, controllers, and/or sensors by comparing their current fingerprints against their earlier fingerprints generated during commissioning. In certain embodiments, the remote sites are residential buildings, office buildings, schools, airports, hospitals, and/or government buildings. In certain embodiments, the data about the functioning of the switchable optical devices includes voltage and/or current versus time data for the switchable optical devices. As an example, the time variable is associated with solar position or weather. In some implementations, the data about the functioning of the switchable optical devices includes changes in peak current to the switchable optical devices, changes in leakage current to the switchable optical devices, change in voltage compensation required to the switchable optical devices, and changes in power consumption of the switchable optical devices. The method may further include receiving data from a BMS, a network controller, and/or a window controller at a remote site. Implementations of the described techniques may include hardware, a method or process, or computer software on a computer-accessible medium.

These and other features of the disclosure will be presented in more detail below with reference to the associated drawings.

BRIEF DESCRIPTION OF THE DRAWINGS

FIG. 8 shows an example of a dashboard for site monitoring system.

FIGS. 18A-H present information used by a site monitoring system to detect and analyze a problem with a window controller in a group of controllers for windows on a single façade.

DETAILED DESCRIPTION

Figure 1A:
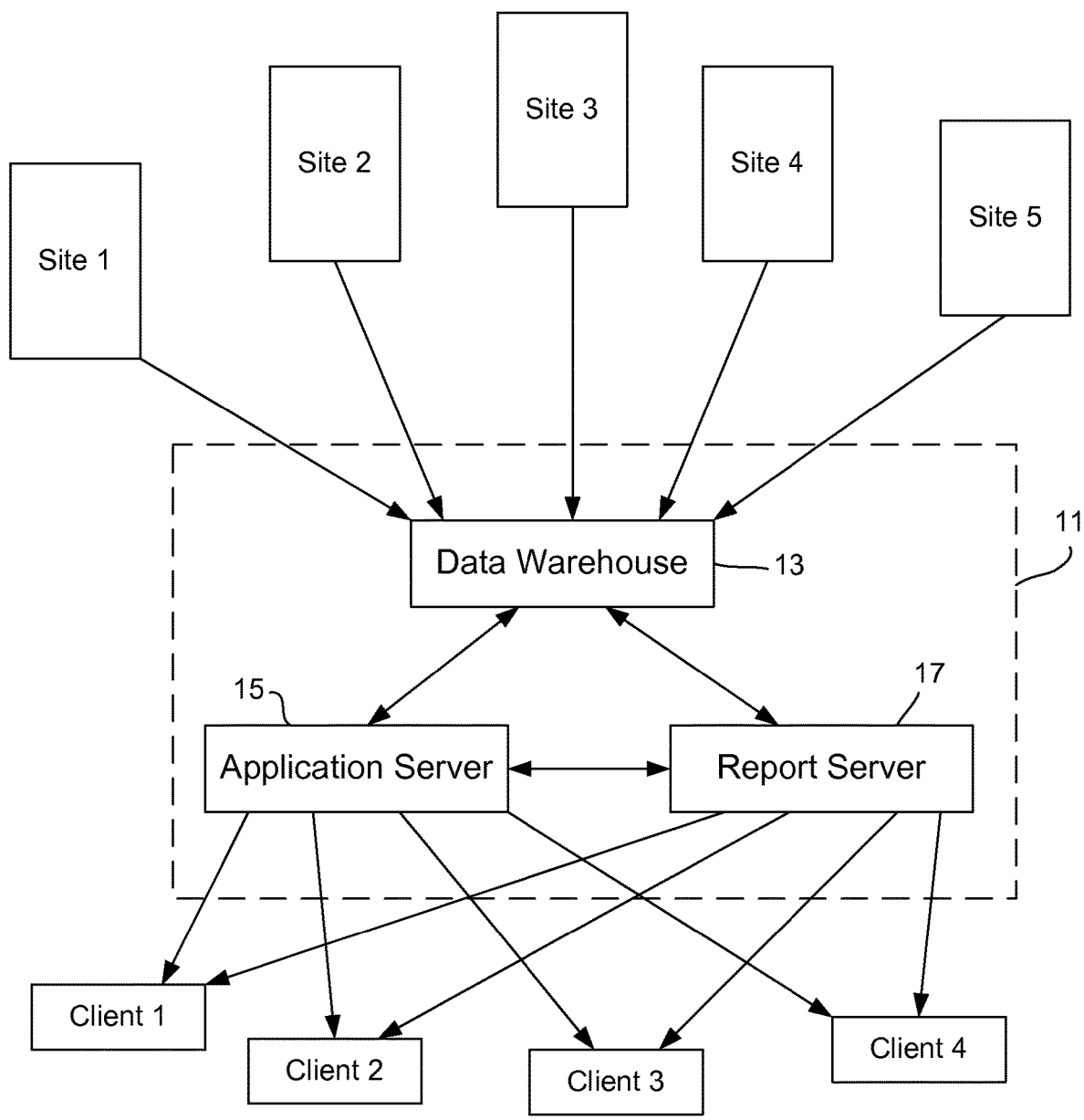
FIG. 1A is a block diagram of a network hierarchy with a monitoring network controller.

This document describes a platform for monitoring one or more buildings or other sites having switchable optical devices deployed therein. In some cases, the sites each have one or more controllers, each controlling the switching of one or more devices. The site may also have sensors such as light sensors, thermal sensors, and/or occupancy sensors, for example, that provide data used in making decisions about when and by how much (tint level) to switch the devices. In certain embodiments, the optical devices are electrochromic devices on structures such as windows and/or mirrors. In the description that follows, switchable optical devices are often referred to as "windows" or "electrochromic windows". It should be understood that such terms include structures other windows that have switchable optical devices. Further, the switchable devices are not limited to electrochromic devices, but include such other switchable devices as liquid crystal devices, electrophoretic device, and the like, which may be non-pixelated.

A site monitoring system may analyze information from sites to determine when a device, a sensor, or a controller has a problem. The system may, if appropriate, act on the problem. In certain embodiments, the system learns customer/user preferences and adapts its control logic to meet the customer's goals.

In a related way, the system may learn how to better conserve energy, sometimes through interaction with a site's lighting and/or HVAC systems, and then modify the controller settings accordingly. By doing this over multiple sites, the system may learn entirely new energy control methods, which it can deploy on other sites. As an example, the system may learn how to control heating load when confronted with a type of rapidly changing weather (e.g., a storm). Through experience, the system learns how to adjust window tinting, e.g. at sites where storms occur frequently, and then apply its learned mode of adjustment to other sites when storms occur there. The system may in turn learn something new from adjusting window tint at the latter storm site and relay that learning to the previous or other sites.

In certain embodiments, the site monitoring system includes a dashboard that flags sites with windows, sensors, and/or controllers that are out of specification. The dashboard allows a technician to view the details of a flagged window, sensor, or controller and see the log or performance data of the component. Thus the system allows for proactive and/or prophylactic adjustment and/or repair of a window, sensor or controller, e.g. before the end user may realize the performance of the unit is out of specification. In this way a better end user experience is realized.

System Terminology

Site monitoring system—A processing center that communicates with multiple sites. It receives data about the switchable optical devices and associated controllers and sensors at the sites, and from this data, it may detect and/or present potential problems, identify trends in the performance of devices and/or controllers, modify algorithms for controlling the switchable optical devices, etc. It may also send data and/or control messages to the sites, sometimes in response to data it receives from the sites. A site monitoring system is typically located remotely from one or more of the multiple sites that it monitors.

Site—This is the building or other location of installed switchable optical devices. The sites communicate with the site monitoring system to allow monitoring and optionally control. Examples of sites include residential buildings, office buildings, schools, airports, hospitals, government buildings, etc. The switchable devices may be provided in a network and operated under the control of one or more algorithms. Transitions from one optical state to another may be dictated by programs or logic such as that described in U.S. patent application Ser. No. 13/772,969, filed Feb. 21, 2013, which is incorporated herein by reference in its entirety. The one or more control functions (e.g., algorithms) used to control the switchable devices may be implemented on the site by one more window controllers, network controllers and/or master network controllers. As described further below, the system may send and/or retrieve data to any or all of these controllers depending upon the particular setup at each site that the system monitors. For example, the system may communicate with a master network controller at one site, while communicating with network controllers at another site. In another example, the system communicates only with master network controllers at all sites. In yet another example, the system may communicate indirectly with one or more window controllers at a site, for example, the system may communicate directly with a building management system which relays window controller data to the system and vice versa.

Monitoring—The principal way that the site monitoring system acquires information from sites. Monitoring can provide the system with information about the various sensors, windows, controllers, and other window systems in the sites it services.

An "optically switchable device" or "switchable optical device" is a device that changes optical state in response to electrical input. The device is typically, but not necessarily, a thin film device. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

An "optical transition" is a change in any one or more optical properties of a switchable optical device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the switchable optical device.

A "starting optical state" is the optical state of a switchable optical device immediately prior to the beginning of an optical transition. The starting optical state is typically defined as the magnitude of an optical state which may be tint, reflectivity, refractive index, color, etc. The starting optical state may be a maximum or minimum optical state for the switchable optical device; e.g., 90% or 4% transmissivity. Alternatively, the starting optical state may be an intermediate optical state having a value somewhere between the maximum and minimum optical states for the switchable optical device; e.g., 50% transmissivity.

An "ending optical state" is the optical state of a switchable optical device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the switchable optical device; e.g., 90% or 4% transmissivity. Alternatively, the ending optical state may be an intermediate optical state having a value somewhere between the maximum and minimum optical states for the switchable optical device; e.g., 50% transmissivity.

"Bus bar" refers to an electrically conductive strip attached to a conductive layer such as a transparent conductive electrode spanning the area of a switchable optical device. The bus bar delivers electrical potential and current from an external lead to the conductive layer. A switchable optical device includes two or more bus bars, each connected to a single conductive layer of the device. In various embodiments, a bus bar forms a long thin line that spans most of the length or width of a device's conductor sheets. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may different magnitudes or functions such as driving an optical transition or holding an optical state. Between the transparent conductive layers are sandwiched the switchable optical device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of a switchable optical device.

"Effective Voltage" or $V_{eff}$ refers to the potential between the positive and negative transparent conducting layers at any particular location on the switchable optical device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state.

Figure 3:
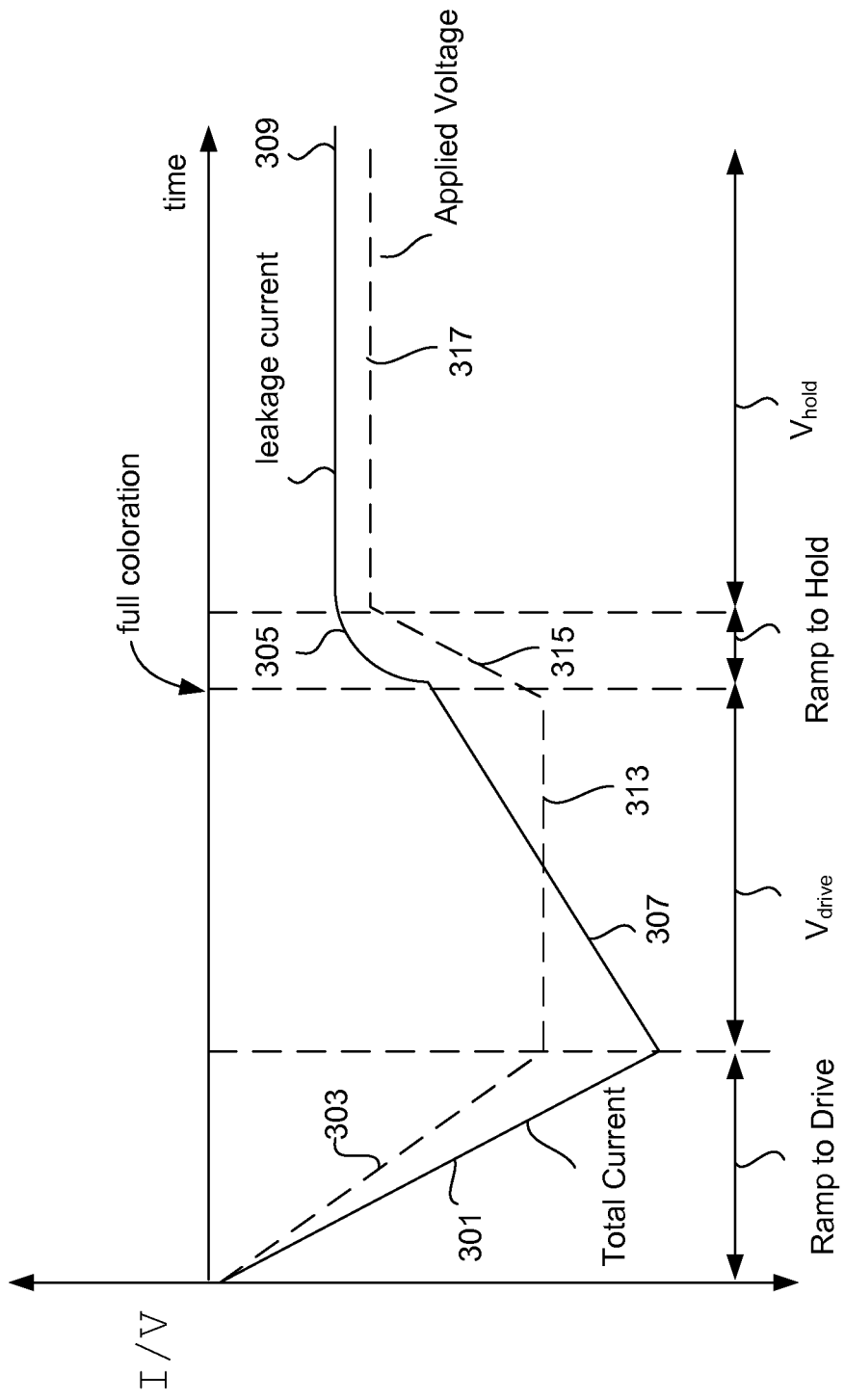
FIG. 3 is a graph depicting certain voltage and current profiles associated with driving an electrochromic device from bleached to colored.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

A window "controller" is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to and from four or more tint levels. Certain electrochromic windows allow intermediate tint levels by using two (or more) electrochromic lites in a single IGU, where each lite is a two-state lite. Other electrochromic windows allow intermediate states by varying the applied voltage to a single electrochromic lite.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Sites and Site Monitoring Systems

One example of network entities and a site monitoring system is depicted in FIG. 1A. As shown there, a site monitoring system 11 interfaces with multiple monitored sites—sites 1-5. Each site has one or more switchable optical devices such as electrochromic windows and one or more controllers designed or configured to control switching of the windows. The site monitoring system 11 also interfaces with multiple client machines—clients 1-4. The clients may be workstations, portable computers, mobile devices such as smartphones, and the like, each able to present information about the functioning of devices in the sites. Personnel associated with site monitoring system 11 may access this information from one or more of the clients. In some instances, the clients are configured to communicate with one another. In some implementations, personnel associated with one or more sites may access a subset of the information via a client. In various implementations, the client machines run one or more applications designed or configured to present views and analysis of the optical device information for some or all of the sites.

Site monitoring system 11 may contain various hardware and/or software configurations. In the depicted embodiment, system 11 includes a data warehouse 13, an application server 15, and a report server 17. The data warehouse interfaces directly with the sites. It stores data from the sites in a relational database or other data storage arrangement. In one embodiment, the data is stored in database or other data repository such as an Oracle DB, a Sequel DB, or a custom designed database. Data warehouse 13 may obtain information from any of a number of entities such as master network controllers at the sites. Examples of network arrangements containing a hierarchy of controllers are described below with reference to FIGS. 1B-D. Application server 15 and report server 17 interface with the clients to provide application services and reports, respectively. In one embodiment, the report server runs Tableau, Jump, Actuate, or a custom designed report generator. In the depicted embodiment, data warehouse 13 and application server 15 each provide information to report server 17. Communication between data warehouse 13 and application server 15 is bidirectional, as is communication between data warehouse 13 and report server 17 as well as application server 15 and report server 17.

Figure 1B:
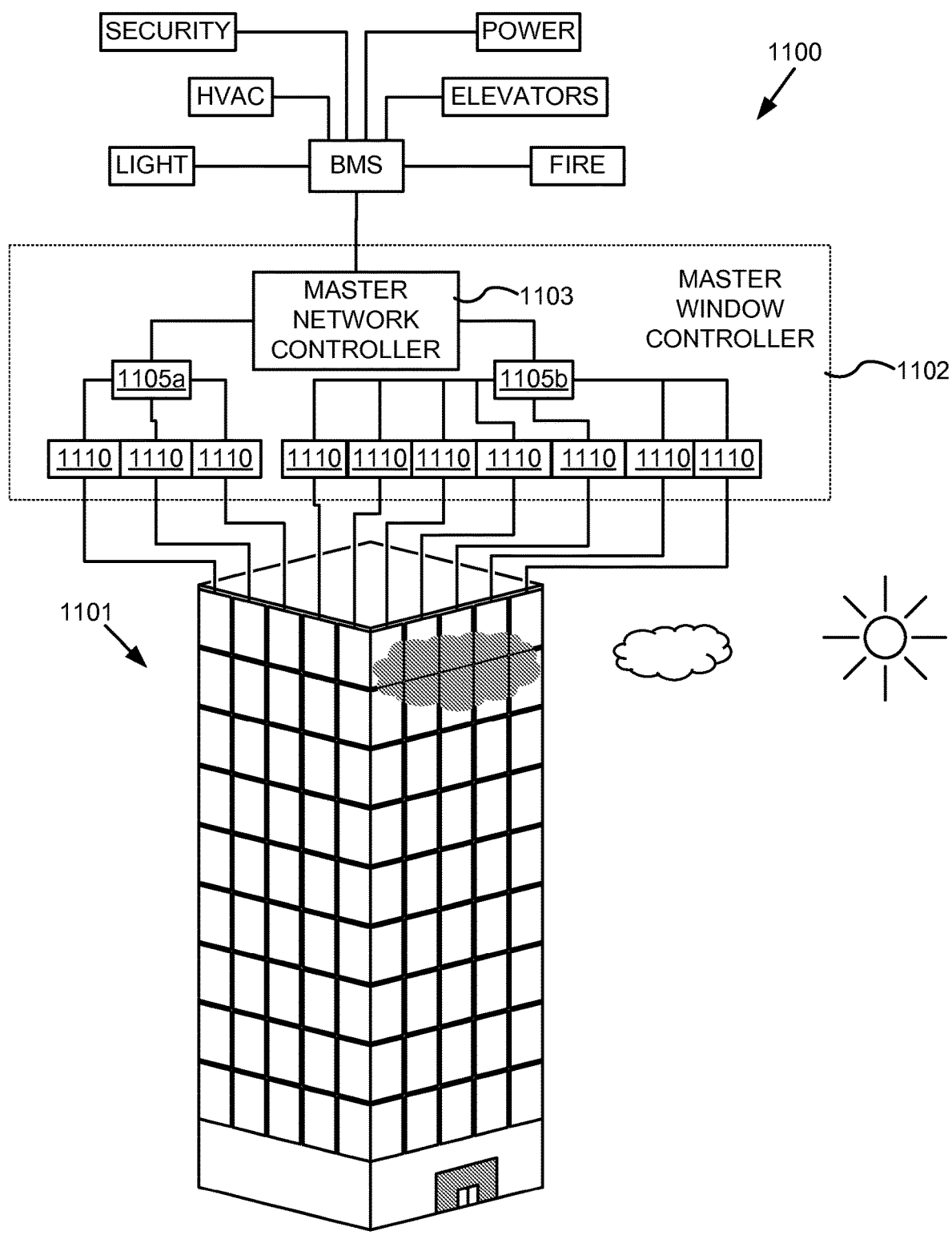
FIG. 1B depicts a schematic diagram of an embodiment of a building management system (BMS).
Figure 1C:
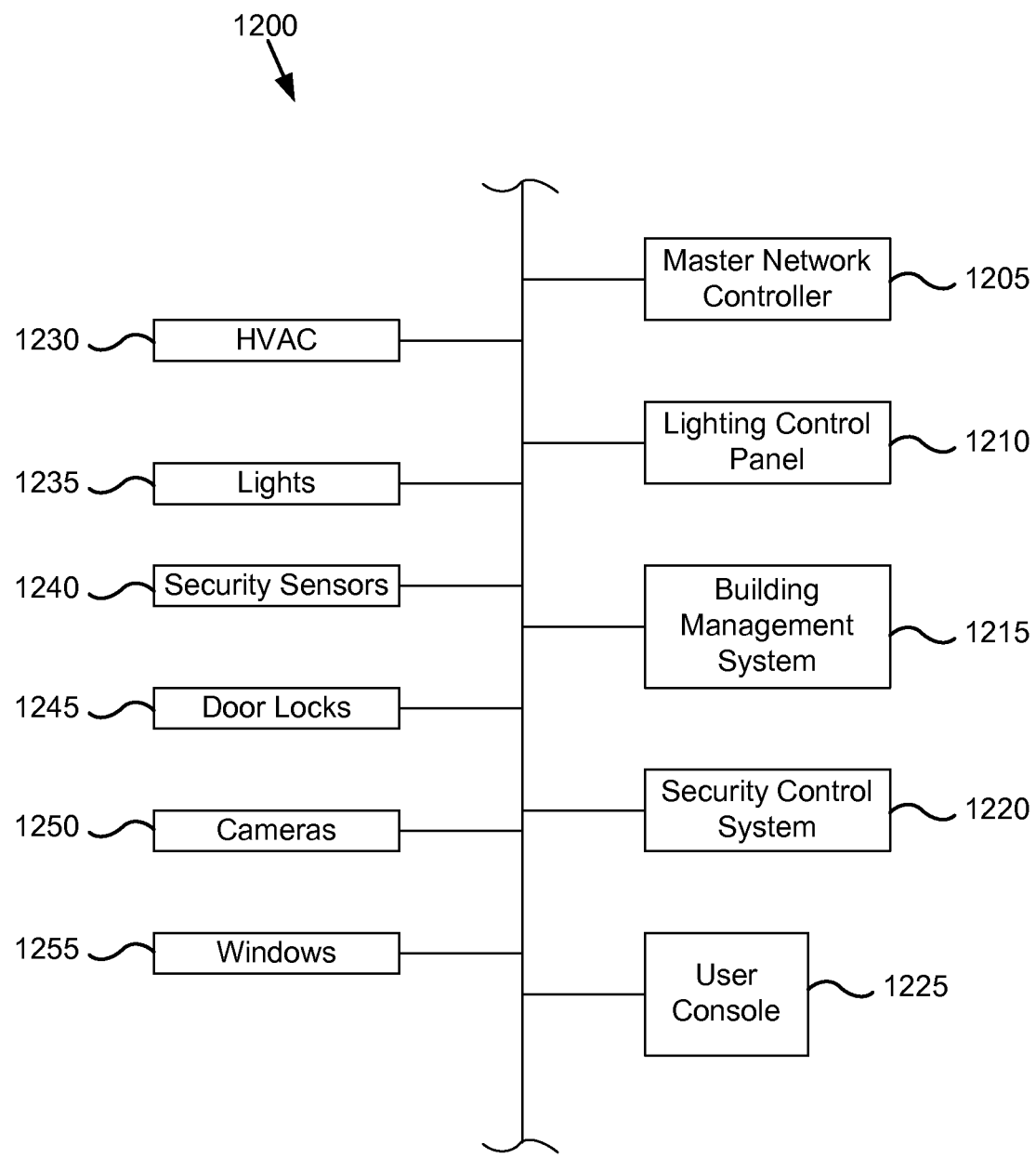
FIG. 1C depicts a block diagram of a building network.
Figure 1D:
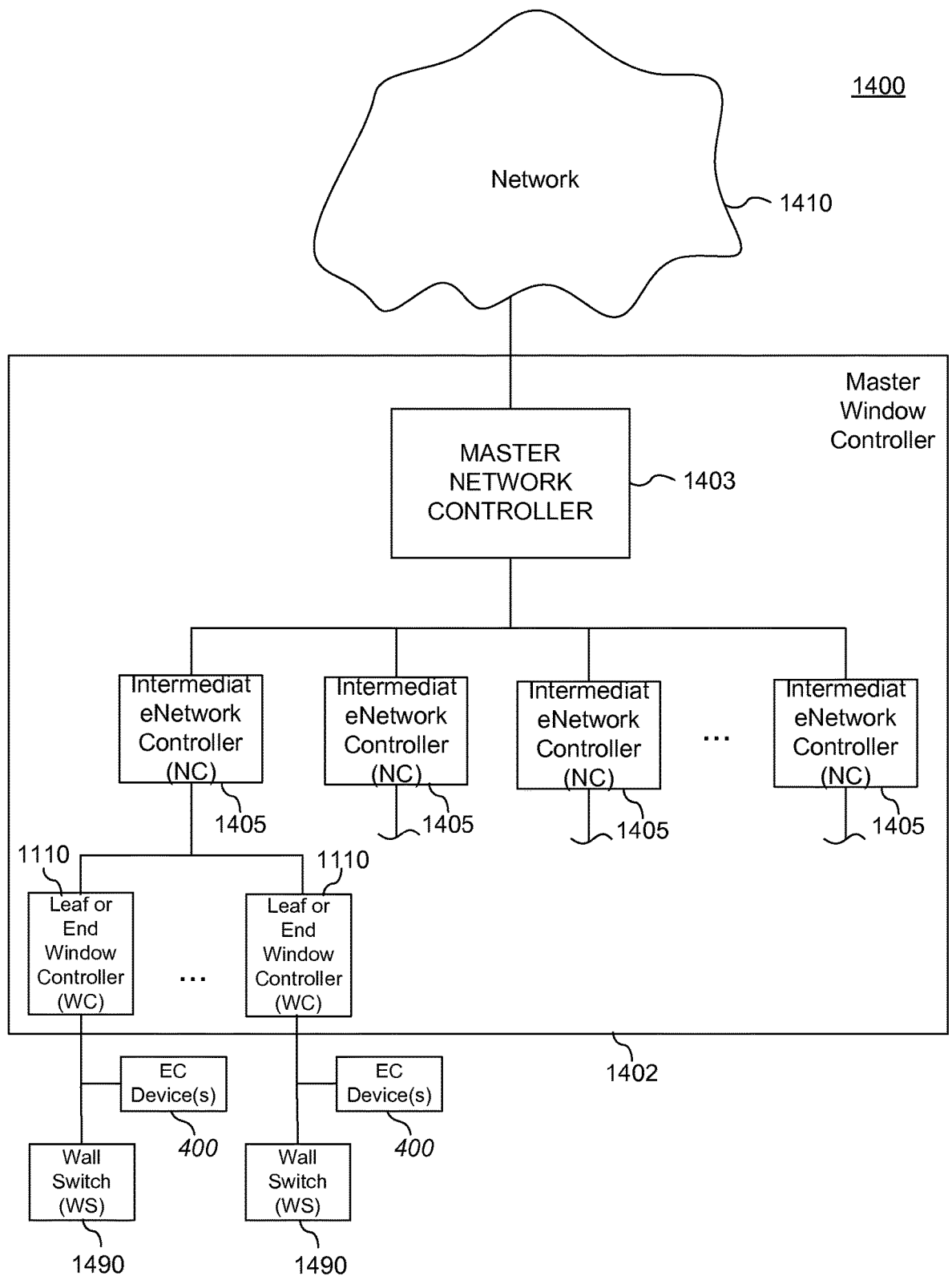
FIG. 1D is a block diagram of components of a system for controlling functions of one or more tintable windows of a building.

Examples of site configurations are shown in FIGS. 1B-D and discussed below. In certain embodiments, a site includes (a) multiple switchable optical devices, each directly controlled by a (window) controller, (b) multiple sensors such as illumination sensors, and (c) one or more higher level controllers such as network controllers and master network controllers.

The site monitoring system may include one or more interfaces for communicating with the remote sites. These interfaces are typically ports or connections for securely communicating over the internet. Of course, other forms of network interfaces may be used. The data may be compressed before sending from a site to the site monitoring system. The site monitoring system may interface with the individual sites via a wireless connection or cable connection. In certain embodiments, the site monitoring system is implemented in the "cloud". A site monitoring system can be centralized or distributed and can be accessed from anywhere using client application by authorized personnel. The various components of the system may be located together or apart in one or more sites, a location remote from all sites and/or in the cloud. Additional features, functions, modules, etc. of the site monitoring system may include a data and event reporter, a data and event log and/or a database, data analyzer/reporter, and communicator.

While in many embodiments, all or most of the site data analysis is performed at the site monitoring system, this is not always the case. In some implementations, some site level analytics, data compression, etc. is performed at the remote site prior to sending site data to the site monitoring system. For example a network or master network controller may have sufficient processing power and other resources for conducting analytics, data compression, etc. and thus processing may be distributed to take advantage of this. This distribution of processing power may not be static, that is, depending on what functions are being performed, the monitoring system may draw on remote processors for performing the aforementioned tasks, or not. Thus the monitoring system may be configured with the flexibility of using remote processors at the site or not.

Through monitoring of the sensors and controllers at the various installations, a site monitoring system can provide any one or more of the following services:

a. Customer service—the site monitoring system will note when data from a switchable device, a sensor, and/or a controller indicates a problem. The problem may be immediate, such as a malfunction, or an impending problem can be anticipated, e.g. when a component's performance drifts from specified parameters (while still functioning adequately). In response, service personnel may visit the remote location to correct the problem and/or communicate to the remote location, installation that there is a problem. In the latter scenario, service personnel may, e.g., reprogram the switchable device's controller to compensate for a drift from specification. In some instances, potential issues are flagged and resolved before they become apparent at a site. For example, the aforementioned reprogramming may provide adequate performance from the window permanently or provide adequate performance until a field service person can visit the site and replace or repair the unit. Additionally, the monitoring system may be configured to autocorrect problems with sites. Unless stated otherwise, any of the problems, issues, errors, etc. described herein can be autocorrected using heuristics in the site monitoring system. In one example, the monitoring system detects a drift from specification in an electrochromic window and automatically reprograms the window's controller(s) to compensate for the drift. The system also alerts service personnel as to this event. The service personnel can then decide the best course of action, e.g., further reprogramming, replacing the window, replacing the controller, and the like. The occupant may have no indication that anything has gone awry with the window and/or controller, the occupant's perception of the window's performance may be unchanged throughout these.

Alert notifications may be sent when issues are detected.

This system enables quick resolution of problems. For example, a dashboard interface may provide the ability to drill down into issues from a high level summary. From the high level summary, the system may provide easy access to site-specific context based log file sections, schematics, pictures and reports. In some implementations, the system flags an entire site when one or more problems with the site are identified. In this way, persons interacting with the system need not be exposed to minutiae concerning the issue until they want such information. Thus, e.g., service personnel can quickly choose a flagged site, and drill down to the actual problem, which may be e.g. a single window with a non-critical issue. This allows the service personal to (a) quickly determine where problems arise, (b) quickly determine the nature of the problem at each site, and (c) prioritize any problems effectively. See FIG. 8.

The system may also provide look ahead data to a site's other systems such as HVAC systems, thereby enabling such systems to enhance user comfort and/or save energy.

b. Customize the installation based on observed usage trends. User preferences may be incorporated in a program over time. As an example, the site monitoring system may determine how an end user (e.g. occupant) tries to override a window control algorithm at particular times of day and uses this information to predict future behavior of the user. It may modify the window control algorithm to set tint levels according to the learned user preference.

c. Deploy learned approaches to other installations (e.g., how to best tint windows when an afternoon thunderstorm approaches). There are benefits achieved in using the collective experience and information from an installed base of switchable device networks. For example, it helps to fine tune control algorithms, customize window/network products for a particular market segment, and/or test new ideas (e.g., control algorithms, sensor placement).

Data Monitored

The following description presents examples of some types of site information that may be monitored by a site monitoring system. The information may be provided from various sources such as voltage and/or current versus time data for individual switchable devices, sensor output version time, communications and network events and logs for controller networks, etc. The time variable may be associated with external events such as solar position, weather, etc. Information with a periodic component may be analyzed in the frequency domain as well as the time domain.

Some of the information described in this section may be considered in the context of the figures presented herein.

1. From window controllers I/V data:
    a. Changes in peak current [this is sometimes produced during application of a ramp to drive voltage for producing an optical transition. See FIGS. 2 and 3.]
    b. Changes in hold (leakage) current [this may be observed at an end state of a switchable device. A rate of increasing leakage current may correlate with the likelihood that a short has developed in the device. Sometimes a short causes an undesirable blemish such as a halo in the device. These may be field serviceable using, e.g., a portable defect mitigation apparatus such as described in U.S. patent application Ser. No. 13/859,623, filed Apr. 9, 2013, which is incorporated herein by reference in its entirety.]
    c. Change in voltage compensation required [Voltage compensation is the change in voltage required to account for the voltage drop in the conductive path from the power supply to the switchable device.]
    d. Change in total charge transferred [measured over a period of time and/or during a certain state of the switchable device (e.g., during drive or during hold).]
    e. Change in power consumption [Power consumption may be calculated by (I*V) per window or controller.]
    f. Comparison with other WC (window controllers) on the same façade with identical loads [This allows the monitoring system to determine that a particular controller has an issue, rather than a particular device controlled by the controller. For example, a window controller may be connected to five insulated glass units, each exhibiting the same issue. Because it is unlikely that five devices will all suffer from the same issue, the monitoring system may conclude that the controller is to blame.]
    g. Instances of abnormal profiles: e.g., double tinting/double clearing [Double tinting/clearing refers to a situation where a normal drive cycle (voltage and/or current profile) is applied and it is found that the switchable device has not switched, in which case a second drive cycle must be conducted. See FIG. 12.]
    h. Switching characteristics vs. external weather [At certain temperatures or weather conditions, the monitoring system expects particular switching results or performance. Deviations from the expected response suggests an issue with a controller, a switchable device, and/or a sensor.]

The changes and comparisons described here can be produced from data collected at, e.g., the network controller level. Historical data (days, weeks, months, years) is preserved in the site monitoring system, and such data can be used for comparison. With such data, variations due to temperature can be identified and ignored, if appropriate. The various changes, along or in combination, may provide a signature of a problem in a window, a controller, a sensor, etc. Any one or more of the foregoing parameters may identify an increase in impedance at any position from the power supply to (and including) the switchable device. This path may include the switchable device, a bus bar connected to the device, a lead attach to the bus bar, a connector to the lead attach or IGU, a group of wires (sometimes called a "pigtail") between the connector (or IGU) and the power supply. As an example, a change in any or more of parameters 1a-1e may indicate corrosion caused by water in a window frame. A model using a combination of these parameters may recognize the signature of such corrosion and accurately report this issue remotely.

2. From window controller state and zone state changes:
    a. Any window controller getting out of sync with its zone—for example, this may be due to communication issues [Example: If there are multiple controllers in a zone of a site, and one of these controllers does behave as expected, the site monitoring system may conclude that the aberrant controller is not receiving or following commands over a communications network. The site monitoring system can take action to isolate the source of the problem and correct it.]
    b. Longest switching time for the zone and adjustments to make all glass switch at the same rate [The site monitoring system may identify a particular switchable device that is not switching at a desired rate or an expected rate. See FIG. 15. Without replacing or modifying the device, the monitoring site may modify the switching algorithm so that the device switches at the expected rate. For example, i f a device is observed to switch too slowly, its ramp to drive or drive voltage may be increased. This can be done remotely, and automatically in certain embodiments.]

3. From system logs:
    a. Any change in frequency of communication errors— increase in noise or device degradation [The received communications from a controller may be slowed or stopped. Or, the send communications may not be acknowledged or acted upon.]
    b. Connection degradation if a pigtail (or other connection) starts showing up as disconnected [In certain embodiments, a connector, e.g including a memory and/or logic, provides a signal indicating that it is becoming disconnected. A window controller may receive such signals, which can be logged at the remote site monitoring system. See FIG. 13. A further description pigtails and other electrical connection features is presented in U.S. patent application Ser. No. 14/363,769, filed Nov. 27, 2014, which is incorporated herein by reference in its entirety.]

4. From photosensor data:
   a. Any degradation over time [This may be manifest as a signal magnitude reduction. It may be caused by various factors including damage to the sensor, dirt on the sensor, an obstruction appearing in front of the sensor, etc.]
   b. Correlation with external weather [Normally, the site monitoring system will assume that the photosensor output should correlate with the weather.]
   c. Comparison with zone state change to ensure that a site's window control technology is working correctly [The site monitoring system normally expects that the zone will change state when its photosensor output meets certain state-change criteria. For example, if the sensor indicates a transition to sunny conditions, the switchable devices in the zone should tint. In certain embodiments, there are one or more photosensors per zone. See FIGS. 14A-D.]
   d. Any changes in surroundings after commissioning [As an example, a tree grows in front of one or more sensors, a building is constructed in front of one or more sensors or a construction scaffold is erected in front of one or more sensors. Such changes in surroundings may be evidenced by multiple sensors affected by the changes being similarly affected (e.g., their photosensor outputs go down at the same time). Among other purposes, commissioning serves to provide information about the deployment of sensors, controllers, and/or switchable optical devices in a site. Commissioning is further described in PCT Application No. PCT/US2013/036456, filed Apr. 12, 2013, which is incorporated herein by reference in its entirety.]
5. From log file analysis of driver of state changes:
   a. Overrides by zone—further tuning of control algorithms for the zone [The site monitoring system may learn the requirements of a particular site and adapt its learning algorithm to address the requirements. Various types of adaptive learning are described in PCT Application No. PCT/US2013/036456, filed Apr. 12, 2013, which was previously incorporated herein by reference in its entirety.]
   b. Mobile device vs. Wall Switch overrides—consumer preference [When overrides are observed, the monitoring system may note which type of device initiated the override, e.g., a wall switch or a mobile device. More frequent use of wall switches may indicate a training issue or a problem with the window application on the mobile device.]
   c. Time/Frequency of various states—usefulness of each state [When multiple tint states are available, and some are underused, it may indicate to the remote monitoring system that there is an issue with a particular state. The system may change the transmissivity or other characteristic of the state.]
   d. Variation by market segment [The frequency of use (popularity) of certain states or other properties of a site's switching characteristics may correlate with a market segment. When a site monitoring system learns this, it may develop and provide market-specific algorithms. Examples of market segments include airports, hospitals, office buildings, schools, government buildings, etc.]
   e. Total number of transitions—Expected number of cycles over warranty period and life by market segment. [This may provide in situ lifecycle information. See FIG. 12.]
6. Energy calculations:
   a. Energy saved by zone by season, total system energy saving by season [The site monitoring system may compare energy savings from multiple sites to identify algorithms, device types, structures, etc. that provide improvements. Compare sites and improve lower performing sites. See FIGS. 14B and D.]
   b. Provide advanced energy load information to AC system by zone [Buildings have large thermal masses, so air conditioning and heating do not take effect immediately. Using a solar calculator or other predictive tools (described elsewhere herein), the site monitoring system can provide advance notice to HVAC systems so they can begin a transition early. It may be desirable to provide this information by zone. Moreover, a site monitoring system may tint one or more windows or zones to aid the HVAC system in doing its job. For example, i f a heat load is expected on a particular façade, the site monitoring system may provide advance notice to the HVAC system and also tint windows on that side of the building to reduce what would otherwise be the HVAC's cooling requirements. Depending upon the tinting speed of the windows, the site monitoring system can calculate and time tinting and HVAC activation sequences appropriately. For example, if the windows tint slowly, the HVAC activation may be sooner, if they tint quickly, then the HVAC signal to action may be delayed or ramped more slowly to reduce load on the system. See FIGS. 14B and D.]

In certain embodiments, the windows, controllers, and/or sensors have their performance or response checked at an initial point in time and thereafter rechecked repeatedly. In some cases, recent performance/response measurements are compared with earlier performance/response measurements to detect trends, deviations, stability, etc. If necessary, adjustments can be made or service can be provided to address trends or deviations detected during comparisons. The collection of relevant parameters for a window, sensor, or controller may serve as a "fingerprint" for the device. Such parameters include voltage response, current response, communications fidelity, etc. as described elsewhere herein. In some embodiments, windows, sensors, and/or controllers are checked and optionally fingerprinted at the factory. For example, a switchable window may go through a burn in procedure during which relevant parameters can be extracted. Windows exhibiting problems can have their current performance compared against earlier fingerprints to optionally determine whether the problem developed after shipping/installation or during operation. Fingerprints can also be generated, optionally automatically, when the devices are commissioned (e.g., installed at a site and initially detected and cataloged). Fingerprints can be stored in a memory associated with the window, e.g. in a pigtail. The site monitoring system may reprogram the memory in the pigtail (or other memory) remotely and automatically in certain embodiments. Commissioning is described in PCT Patent application No. PCT/US2013/036456, filed Apr. 12, 2013, and incorporated herein by reference in its entirety.

In certain embodiments, during commissioning at a new site, the site monitoring system compares a designed site layout to the actual, as commissioned layout, to flag any discrepancy at time of commissioning. This may be used to correct a device, controller, etc. at the site or to correct design document. In some cases, the site monitoring system simply verifies that all window controllers, network controllers, zones, etc. match between design document and actual site implementation. In other cases, a more extensive analysis is conducted, which may verify cable lengths etc. The comparison may also identify installation problems such as incorrect photosensor orientations, defective photosensors, etc., and optionally automatically correct such problems. As indicated, during commissioning, the site monitoring system may obtain and store initial fingerprints of many or all individual components in the site, including voltage/current measurements at switchable optical devices for different device transitions. Such fingerprints may be used to periodically check the site and detect degradation in upstream hardware (i.e. wiring, power supplies, uninterrupted power supply (UPS)), as well as window controllers and switchable optical devices. Using a UPS in a switchable optical window network is described in U.S. Patent Application No. 62/019,325, filed Jun. 30, 2014, which is incorporated herein by reference in its entirety.

Auto-Detection and Auto-Correction by the Site Monitoring System

While much of the discussion herein focuses on systems for detecting and diagnosing issues with networks of switchable optical devices, a further aspect of the disclosure concerns a site monitoring system that leverages these capabilities to automatically collect data, automatically detect problems and potential problems, automatically notify personnel or systems of problems or potential problems, automatically correcting such problems or potential problems, and/or automatically interfacing with building or corporate systems to analyze data, implement corrections, generate service tickets, etc.

Examples of this Automatic Features of Site Monitoring Systems

1. If there is a slow degradation in current to a window (or other signature of non-fatal issue with switching current received by a window), the site monitoring system can auto-correct this issue by, for example, directing a controller associated with the window to increase the switching voltage to the window. The system may calculate an increase in voltage using empirical and/or analytic techniques that relate changes in current drawn or optical switching properties to changes in applied voltage. The changes in voltage may be limited to a range such as a range defining safe levels of voltage or current for the devices in the window network. The changes to the voltage may be implemented by the site monitoring system reprogramming one or more memories storing tint transition instructions for the window in question. For example, a memory associated with the window, e.g. in a pigtail of the window, is programmed from the factory to contain window parameters that allow a window controller to determine appropriate drive voltages for the electrochromic coating associated with the window. If there is degradation or similar issues, one or more of these parameters may need change and so the site monitoring system reprograms the memory. This may be done, e.g., if the window controller automatically generates drive voltage parameters based on the stored values in the memory (e.g., a memory associated with the pigtail). That is, rather than the site monitoring system sending new drive parameters to the window controller, the system may simply reprogram the window memory so the window controller can determine new drive parameters itself. Of course, the site monitoring system may also provide the tint transition parameters to the window controller, which can then apply them according to its own internal protocol, which may involve storing them in an associated memory or providing them to a higher level network controller.

2. If there is a slow degradation in photosensor (or other signature of non-fatal issue with a sensor) causing a lower than accurate reading, the site monitoring system can auto-correct the sensor reading before using the reading for other purposes such as input for optical device switching algorithms. In certain embodiments, the site monitoring system applies an offset within some limit to compensate a photosensor reading. This allows for, e.g., uninterrupted occupant comfort and automatic adjustment of window tinting for improved aesthetics. Again, for example, the occupant may not realize that any of these changes to the window and/or related components or software has occurred.

3. If the system detects that a room is occupied or learns that the room is commonly occupied, and the tinting algorithm applies a tint after the glare begins, the site monitoring system may automatically adjust the tint algorithm to start earlier, when the room is occupied or predicted to be occupied. In certain embodiments, glare is detected by a photosensor located in a room or outside a room where the glare occurs. The algorithm may employ an occupancy sensor located within the room.

4. When the system detects a difference in tinting times for different windows in the same façade, it may cause all windows to tint at the same time and, if desired, to the same tint level by auto adjusting ramping voltage parameters (if the occupant wants whole façade tinting at the same time).

5. The site monitoring system may detect a window controller that is out of synchronization with other window controllers for a group of windows in a zone or a façade. The description of FIGS. 18A-H contains a detailed explanation of such example. The system may then bring the window back into sync automatically by adjusting the applied switching voltage or taking other remedial action within its control.

Ancillary Services

The remote monitoring system may collect and use local climate information, site lighting information, site thermal load information, and/or weather feed data for various purposes. A few examples follow.

Weather Service Rating: There are existing services that rely on weather feeds/data to sell and/or enable their services. For example, "smart sprinklers" and even landscaping companies using conventional sprinkler systems use weather data to program their watering patterns. These weather data are often local, e.g. zip code based data, and there are multiple sources of weather data. In certain embodiments, the remote monitoring system uses actual data it collects to rate what weather services predict for any given area. The system may determine which is most accurate and provide that rating to services that rely on weather feeds. Any given weather service may be more accurate depending on the geographical area, e.g. weather service A might be best in San Francisco, but not as good in the Santa Clara Valley (where service B is better). The system can provide a rating service identifying which weather feed is more reliable for a given area, by collecting its actual sensor data, doing statistical analysis, and providing to customers as valuable intelligence. This information is useful for entities other than sites; examples include sprinkler companies, companies that use or control solar panels, outdoor venues, any entity that relies on the weather.

Weather Service: A site monitoring system can collect sensor data live over large geographic areas. In certain embodiments, it provides this data to weather services so that they can more accurately provide weather data. In other words, weather services rely heavily on satellite imagery and larger sky pattern data feeds. Information from one more sites with switchable optical devices and associated sensors, widely deployed, can provide real time ground level information on sun, clouds, heat, etc. Combining these two data, more accurate weather forecasts can be achieved. This approach may be viewed as creating a sensor net across the country or other geographic region where multiple sites exist.

Consumer Behavior: Indirect data from end user patterns can be gleaned, e.g. by knowing when/how end users tint or bleach optically tintable windows in any geographical location or region. In certain embodiments, data collected by the site monitoring system is analyzed for patterns that may have value to other consumer products vendors. For example, "heavy tinters" may indicate: aversion to sun/heat, the fact that high sun levels are present, the need for more water in a region, a region ripe for more sunglasses sales, etc. Likewise, "heavy bleachers" may indicate opposite trends that will be useful to vendors that sell, e.g.: sun lamps, tea, books, heating pads, furnaces, tanning booths, and the like.

Building Management System (BMS)

A BMS is a computer-based control system installed at a site (e.g., a building) that can monitor and control the site's mechanical and electrical equipment such as ventilation, lighting, power systems, elevators, fire systems, and security systems. In certain embodiments, a BMS may be designed or configured to communicate with a site monitoring system to receive control signals and communicate monitored information from systems at the site. A BMS consists of hardware, including interconnections by communication channels to a computer or computers, and associated software for maintaining conditions in the site according to preferences set by the occupants, site manager, and/or site monitoring system manager. For example, a BMS may be implemented using a local area network, such as Ethernet. The software can be based on, for example, internet protocols and/or open standards. One example of software is software from Tridium, Inc. (of Richmond, Va.). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows or other tintable windows. In one embodiment, each of the one or more tintable windows includes at least one all solid state and inorganic electrochromic device. In another embodiment, each of the one or more tintable windows includes only all solid state and inorganic electrochromic devices. In another embodiment, one or more of the tintable windows are multistate electrochromic windows, as described in U.S. patent application Ser. No. 12/851,514, filed on Aug. 5, 2010, and entitled "Multipane Electrochromic Windows."

FIG. 1B depicts a schematic diagram of an embodiment of a site network 1100 having a BMS that manages a number of systems of a building, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS manages a master window controller 1102. In this example, master window controller 1102 is depicted as a distributed network of window controllers including a master network controller, 1103, intermediate network controllers, 1105a and 1105b, and end or leaf controllers 1110. End or leaf controllers 1110 may be similar to window controller 450 described with respect to FIGS. 4 and 5. For example, master network controller 1103 may be in proximity to the BMS, and each floor of building 1101 may have one or more intermediate network controllers 1105a and 1105b, while each window of the building has its own end or leaf controller 1110. In this example, each of controllers 1110 controls a specific tintable window of building 1101. In certain embodiments, master window controller 1102 and/or master network controller 1103 communicates with the site monitoring system or component thereof such as a data warehouse.

Each of controllers 1110 can be in a separate location from the tintable window that it controls, or can be integrated into the tintable window. For simplicity, only ten tintable windows of building 1101 are depicted as controlled by master window controller 1102. In a typical setting there may be a large number of tintable windows in a building controlled by master window controller 1102. Master window controller 1102 need not be a distributed network of window controllers. For example, a single end controller which controls the functions of a single tintable window also falls within the scope of the embodiments disclosed herein, as described above. Advantages and features of incorporating tintable window controllers as described herein with BMSs are described below in more detail and in relation to FIG. 1B, where appropriate.

One aspect of the disclosed embodiments is a BMS including a multipurpose window controller as described herein. By incorporating feedback from a window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the tintable windows can be automatically controlled. In certain embodiments, any one or more of these functions can be provided by the site monitoring system, which may communicate with windows and window controllers directly or indirectly, via a BMS.

In some embodiments, a BMS may not be present or a BMS may be present but may not communicate with a master network controller or communicate at a high level with a master network controller such as when a site monitoring system communicates with the master window controller directly. In these embodiments, a master network controller can provide, for example, enhanced: 1) environmental control, 2) energy savings, 3) flexibility in control options, 4) improved reliability and usable life of other systems due to less reliance thereon and therefore less maintenance thereof, 5) information availability and diagnostics, 6) effective use of staff, and various combinations of these, because the tintable windows can be automatically controlled. In these embodiments, maintenance on the BMS would not interrupt control of the tintable windows.

In certain embodiments, a BMS may be in communication with a site monitoring system to receive control signals and transmit monitored data from one or more systems in a site network. In other embodiments, the site monitoring system may be in direct communication with the master window controller and/or other systems in a site network to manage the systems.

FIG. 1C depicts a block diagram of an embodiment of a site network 1200 for a site (e.g., building). As noted above, the network 1200 may employ any number of different communication protocols, including BACnet. As shown, site network 1200 includes a master network controller 1205, a lighting control panel 1210, a BMS 1215, a security control system, 1220, and a user console, 1225. These different controllers and systems at the site may be used to receive input from and/or control a HVAC system 1230, lights 1235, security sensors 1240, door locks 1245, cameras 1250, and tintable windows 1255, of the site.

Lighting Control Panel for Building

Master network controller 1205 may function in a similar manner as master network controller 1103 described with respect to FIG. 1B. Lighting control panel 1210 may include circuits to control the interior lighting, the exterior lighting, the emergency warning lights, the emergency exit signs, and the emergency floor egress lighting. Lighting control panel 1210 also may include occupancy sensors in the rooms of the site. BMS 1215 may include a computer server that receives data from and issues commands to the other systems and controllers of site network 1200. For example, BMS 1215 may receive data from and issue commands to each of the master network controller 1205, lighting control panel 1210, and security control system 1220. Security control system 1220 may include magnetic card access, turnstiles, solenoid driven door locks, surveillance cameras, burglar alarms, metal detectors, and the like. User console 1225 may be a computer terminal that can be used by the site manager to schedule operations of, control, monitor, optimize, and troubleshoot the different systems of the site. Software from Tridium, Inc. may generate visual representations of data from different systems for user console 1225.

Each of the different controls may control individual devices/apparatus. Master network controller 1205 controls windows 1255. Lighting control panel 1210 controls lights 1235. BMS 1215 may control HVAC 1230. Security control system 1220 controls security sensors 1240, door locks 1245, and cameras 1250. Data may be exchanged and/or shared between all of the different devices/apparatus and controllers that are part of site network 1200.

In some cases, the systems of site network 1100 or site network 1200 may run according to daily, monthly, quarterly, or yearly schedules. For example, the lighting control system, the window control system, the HVAC, and the security system may operate on a 24 hour schedule accounting for when people are at the site during the work day. At night, the site may enter an energy savings mode, and during the day, the systems may operate in a manner that minimizes the energy consumption of the site while providing for occupant comfort. As another example, the systems may shut down or enter an energy savings mode over a holiday period.

The scheduling information may be combined with geographical information. Geographical information may include the latitude and longitude of a site such as, for example, a building. In the case of a building, geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a site such as, for example, the building 1101 in FIG. 1B, that includes a site network, tintable windows for the exterior windows (e.g., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior condition monitoring, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day.

When a window controller is integrated into a site network, outputs from exterior sensors may be input to a site network and/or site monitoring system. In some cases, these outputs may be provided as input to a local window controller. For example, in some embodiments, output signals from any two or more exterior sensors are received. In some embodiments, only one output signal is received, and in some other embodiments, three, four, five, or more outputs are received. These output signals may be received over a site network.

In some embodiments, the output signals received by sensor(s) include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to a determined level of tint. For example, referring to FIG. 1B, this may include master network controller 1103 issuing commands to one or more intermediate network controllers 1105a and 1105b, which in turn issue commands to end controllers 1110 that control each window of the building. Master network controller 1103 may issue commands based on commands received from a BMS and/or a site monitoring system. End controllers 1100 may apply voltage and/or current to the window to drive the change in tint pursuant to the instructions.

In some embodiments, a site including tintable windows may be enrolled in or participate in a demand response program run by the utility or utilities providing power to the site. The program may be a program in which the energy consumption of the site is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by a BMS of a building, by the site monitoring system, or by window controllers configured to control the tintable windows in the building. This warning signal can be an override mechanism that disengages the tinting control. The BMS or site monitoring system can then instruct the window controller(s) to transition the appropriate electrochromic device in the tintablewindows to a dark tint level aid in reducing the power draw of the cooling systems in the building at the time when the peak load is expected.

In some embodiments, tintable windows (e.g., electrochromic windows) of windows of a site may be grouped into zones with tintable windows in a zone being instructed in a similar manner. For example, the exterior windows of the site (i.e., windows separating the interior from the exterior of a building), may be grouped into zones, with tintable windows in a zone being instructed in a similar manner. For example, groups of tintable windows on different floors of the building or different sides of a building may be in different zones. In one case, on the first floor of the building, all of the east facing tintable windows may be in zone 1, all of the south facing tintable windows may be in zone 2, all of the west facing tintable windows may be in zone 3, and all of the north facing tintable windows may be in zone 4. In another case, all of the tintable windows on the first floor of the building may be in zone 1, all of the tintable windows on the second floor may be in zone 2, and all of the tintable windows on the third floor may be in zone 3. In yet another case, all of the east facing tintable windows may be in zone 1, all of the south facing tintable windows may be in zone 2, all of the west facing tintable windows may be in zone 3, and all of the north facing tintable windows may be in zone 4. As yet another case, east facing tintable windows on one floor could be divided into different zones. Any number of tintable windows on the same side and/or different sides and/or different floors of the building may be assigned to a zone.

In some embodiments, tintable windows in a zone may be controlled by the same window controller. In some other embodiments, tintable windows in a zone may be controlled by different window controllers, but the window controllers may all receive the same output signals from sensors and use the same function or lookup table to determine the level of tint for the windows in a zone.

In some embodiments, tintable windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, tintable windows in a zone that includes the windows on a single side of the building may be controlled by a window controller or controllers that receive an output signal from a transmissivity sensor.

In some embodiments, a sensor (e.g., photosensor) may provide an output signal to a window controller to control the tintable windows of a first zone (e.g., a master control zone). The window controller may also control the tintable windows in a second zone (e.g., a slave control zone) in the same manner as the first zone. In some other embodiments, another window controller may control the tintable windows in the second zone in the same manner as the first zone.

In some embodiments, a site manager, occupants of rooms in the second zone, or other person may manually instruct (using a tint or clear command or a command from a user console of a BMS, for example) the tintable windows in the second zone (i.e., the slave control zone) to enter a tint level such as a colored state (level) or a clear state. In some embodiments, when the tint level of the windows in the second zone is overridden with such a manual command, the tintable windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a site manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the tintable windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a site network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions. In addition, other systems of a site network may include components for wired or wireless communication between different system elements.

A separate communication node for wireless communications can be, for example, another wireless window controller, an end, intermediate, or master window controller, a remote control device, a BMS, or a site monitoring system. Wireless communication is used in the window controller for at least one of the following operations: programming and/or operating the tintable window 505 (see FIG. 5), collecting data from the tintable window 505 from the various sensors and protocols described herein, and using the tintable window 505 as a relay point for wireless communication. Data collected from tintable windows 505 also may include count data such as number of times an EC device has been activated, efficiency of the EC device over time, and the like. These wireless communication features is described in more detail below.

In one embodiment, wireless communication is used to operate the associated tintable windows 505, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a site of which the tintable window is a component or from a site monitoring system managing system.

In one embodiment, when the window controller is part of a distributed network of controllers, wireless communication is used to transfer data to and from each of a plurality of tintable windows via the distributed network of controllers, each having wireless communication components. For example, referring again to FIG. 1B, master network controller 1103, communicates wirelessly with each of intermediate network controllers 1105a and 1105b, which in turn communicate wirelessly with end controllers 1110, each associated with a tintable window. Master network controller 1103 may also communicate wirelessly with a BMS or with a site monitoring system. In one embodiment, at least one level of communication in the window controller is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Example of System for Controlling Functions of Tintable Windows

FIG. 1D is a block diagram of components of a system 1400 for controlling functions (e.g., transitioning to different tint levels) of one or more tintable windows at a site (e.g., building 1101 shown in FIG. 1B), according to embodiments. System 1400 may be one of the systems managed by a site monitoring system through a BMS (e.g., BMS 1100 shown in FIG. 1B) or may be managed directly by a site monitoring system and/or operate independently of a BMS.

System 1400 includes a master window controller 1402 that can send control signals to the tintable windows to control its functions. System 1400 also includes a network 1410 in electronic communication with master window controller 1402. Control logic and instructions for controlling functions of the tintable window(s), and/or sensor data may be communicated to the master window controller 1402 through the network 1410. Network 1410 can be a wired or a wireless network (e.g. a cloud network). In some embodiments, network 1410 may be in communication with a BMS to allow the BMS to send instructions for controlling the tintable window(s) through network 1410 to the tintable window(s) in a building. In some cases, the BMS may be in communication with the site monitoring system to receive instructions for controlling the tintable window(s) from the site monitoring system. In other embodiments, network 1410 may be in communication with a site monitoring system to allow the site monitoring system to send instructions for controlling the tintable window(s) through network 1410 to the tintable window(s) in a building. In certain embodiments, the master window controller 1402 and/or the master network controller 1403 are designed or configured to communicate with the site monitoring system or component thereof such as a data warehouse.

System 1400 also includes EC devices 400 of the tintable windows (not shown) and wall switches 1490, which are both in electronic communication with master window controller 1402. In this illustrated example, master window controller 1402 can send control signals to EC device(s) to control the tint level of the tintable windows having the EC device(s). Each wall switch 1490 is also in communication with EC device(s) and master window controller 1402. An end user (e.g., occupant of a room having the tintable window) can use the wall switch 1490 to control the tint level and other functions of the tintable window having the EC device(s).

In FIG. 1D, master window controller 1402 is depicted as a distributed network of window controllers including a master network controller 1403, a plurality of intermediate network controllers 1405 in communication with the master network controller 1403, and multiple pluralities of end or leaf window controllers 1110. Each plurality of end or leaf window controllers 1110 is in communication with a single intermediate network controller 1405. Although master window controller 1402 is illustrated as a distributed network of window controllers, master window controller 1402 could also be a single window controller controlling the functions of a single tintable window in other embodiments. The components of the system 1400 in FIG. 1D may be similar in some respects to components described with respect to FIG. 1B. For example, master network controller 1403 may be similar to master network controller 1103 and intermediate network controllers 1405 may be similar to intermediate network controllers 1105. Each of the window controllers in the distributed network of FIG. 1D may include a processor (e.g., microprocessor) and a computer readable medium in electrical communication with the processor.

In FIG. 1D, each leaf or end window controller 1110 is in communication with EC device(s) 400 of a single tintable window to control the tint level of that tintable window in the building. In the case of an IGU, the leaf or end window controller 1110 may be in communication with EC devices 400 on multiple lites of the IGU control the tint level of the IGU. In other embodiments, each leaf or end window controller 1110 may be in communication with a plurality of tintable windows. The leaf or end window controller 1110 may be integrated into the tintable window or may be separate from the tintable window that it controls. Leaf and end window controllers 1110 in FIG. 1D may be similar to the end or leaf controllers 1110 in FIG. 1B and/or may also be similar to window controller 450 described with respect to FIG. 5.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1110 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, WiFi, Zigbee, and the like. Although wall switches 1490 depicted in FIG. 1D are located on the wall(s), other embodiments of system 1400 may have switches located elsewhere in the room.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Example Switching Algorithm

Figure 2:
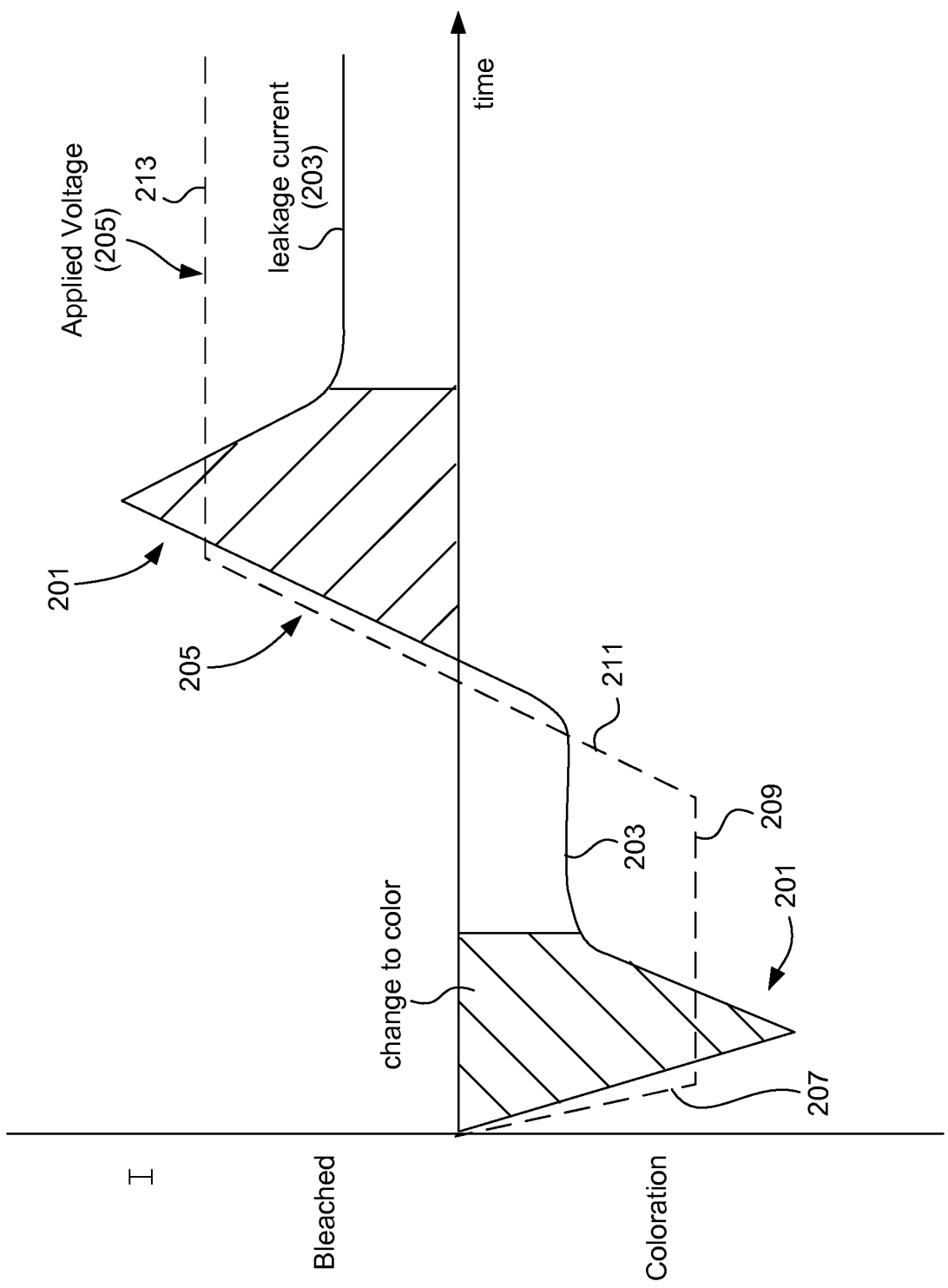
FIG. 2 is a graph depicting voltage and current profiles associated with driving an electrochromic device from bleached to colored and from colored to bleached.

To speed along optical transitions, the applied voltage is initially provided at a magnitude greater than that required to hold the device at a particular optical state in equilibrium. This approach is illustrated in FIGS. 2 and 3. FIG. 2 is a graph depicting voltage and current profiles associated with driving an electrochromic device from bleached to colored and from colored to bleached. FIG. 3 is a graph depicting certain voltage and current profiles associated with driving an electrochromic device from bleached to colored.

FIG. 2 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes. Many different types electrochromic device will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 203) represent electronic leakage current while the device is in the new optical state.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the colored state and voltage hold 209 maintains the device in the colored state until voltage ramp 211 in the opposite direction drives the transition from colored to bleached states. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 3.

The voltage values depicted in FIG. 3 represent the applied voltage (Vapp) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant Vapp magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of Vhold is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of Vdrive and possibly a higher ramp rate in the ramp to drive component. Larger devices may also require higher values of $V_{hold}$. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 3 correspond to the Vapp values described above. They do not correspond to the Veff values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that Vdrive remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from Vdrive to Vhold, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Figure 4:
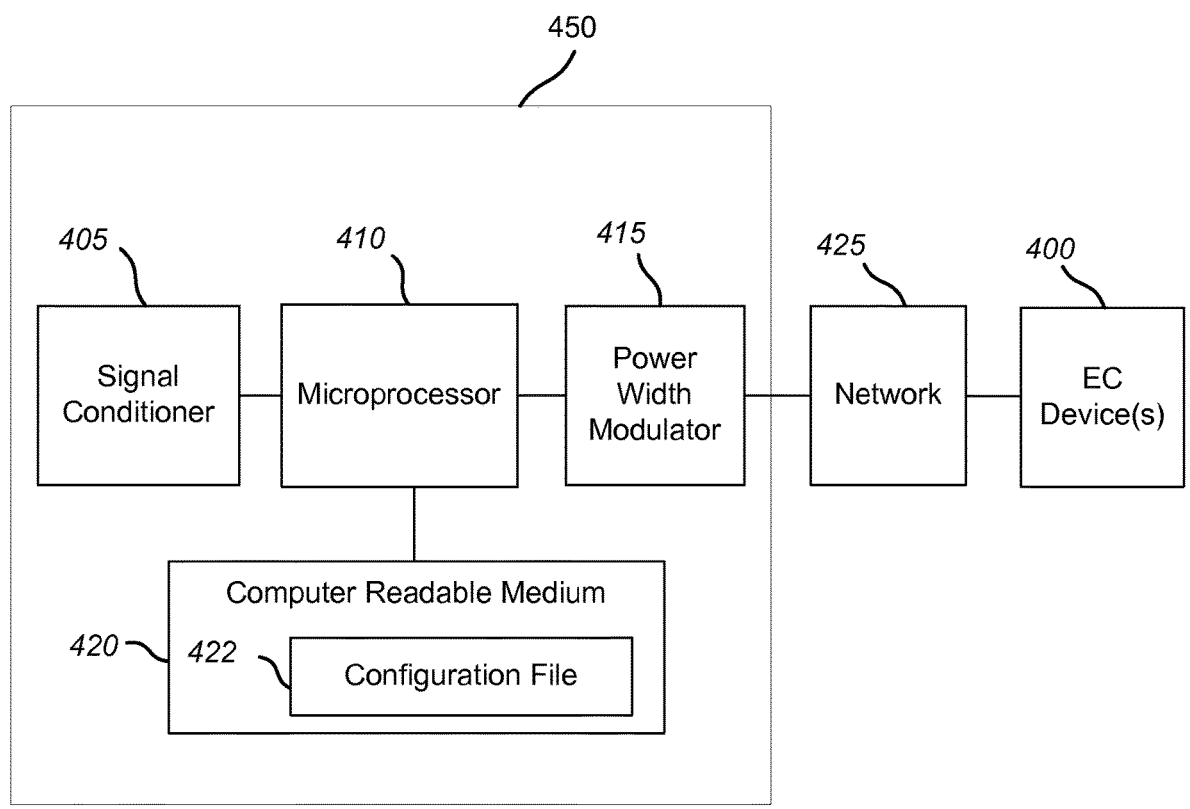
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a window controller 450 having a microprocessor 410 or other processor, a power width modulator (PWM) 415, a signal conditioning module 405, and a computer readable medium 420 (e.g., memory) having a configuration file 422. Window controller 450 is in electronic communication with one or more electrochromic devices 400 in an electrochromic window through network 425 (wired or wireless) to send instructions to the one or more electrochromic devices 400. In some embodiments, the window controller 450 may be a local window controller in communication through a network (wired or wireless) to a master window controller.

In disclosed embodiments, a site may be a building having at least one room having an electrochromic window between the exterior and interior of a building. One or more sensors may be located to the exterior of the building and/or inside the room. In embodiments, the output from the one or more sensors may be input to the signal conditioning module 405 of the window controller 450. In some cases, the output from the one or more sensors may be input to a BMS or to a site monitoring system. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Room Sensors and Window Controller

Figure 5:
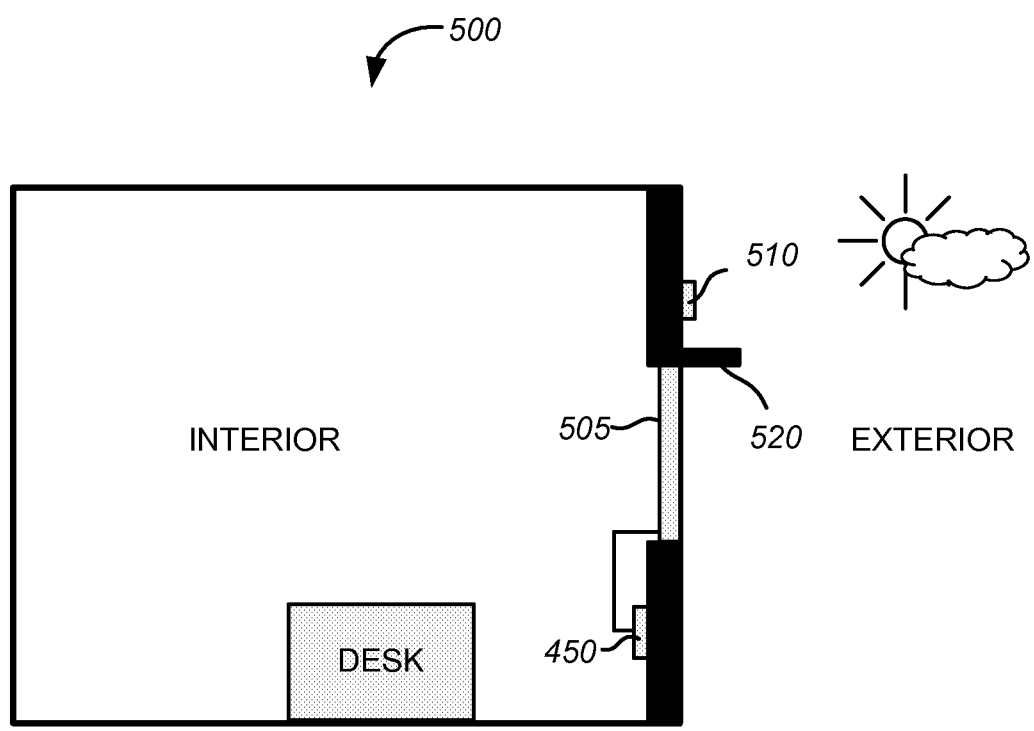
FIG. 5 depicts a schematic diagram of a room including a tintable window and at least one sensor.

FIG. 5 depicts a schematic diagram of a room 500 having a tintable window 505 with at least one electrochromic device. The tintable window 505 is located between the exterior and the interior of a building, which includes the room 500. The room 500 also includes a window controller 450 connected to and configured to control the tint level of the tintable window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single tintable window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to a BMS or site monitoring system. The input may be in the form of a voltage signal. The BMS or site monitoring system may process the input and pass an output signal with tinting instructions to the window controller 450 directly or through a master window controller 1102 (shown in FIG. 1B). The tint level of the tintable window 505 may be determined based on various configuration information, override values. Window controller 450 then instructs the PWM 415, to apply a voltage and/or current to tintable window 505 to transition to the desired tint level.

In disclosed embodiments, window controller 450 can instruct the PWM 415, to apply a voltage and/or current to tintable window 505 to transition it to any one of four or more different tint levels. In disclosed embodiments, tintable window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the tintable window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

The BMS or site monitoring system in communication with the window controller 450 or a master window controller in communication with the window controller 450 may employ any control logic to determine a desired tint level based on signals from the exterior sensor 510 and/or other input. The window controller 415 can instruct the PWM 460 to apply a voltage and/or current to electrochromic window 505 to transition it to the desired tint level.

Control Logic for Controlling Windows in a Building

Figure 6:
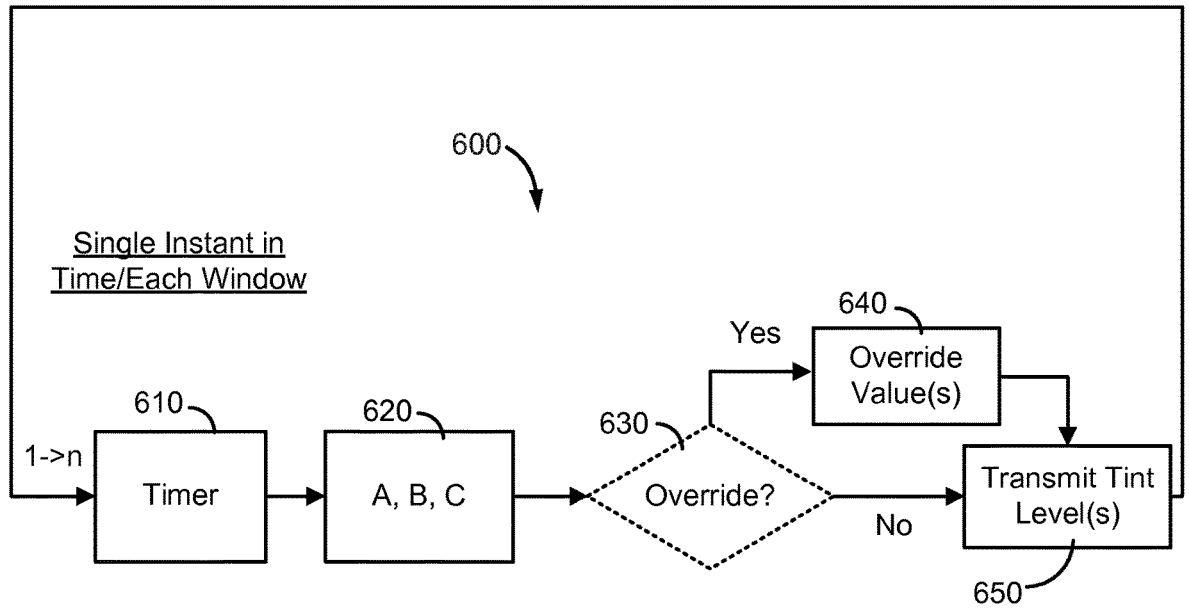
FIG. 6 is a flowchart showing some steps of predictive control logic for a method of controlling one or more electrochromic windows in a building.

FIG. 6 is a flowchart showing exemplary control logic for a method of controlling one or more tintable windows at a site, according to embodiments. The control logic uses one or more of the Modules A, B, and C to calculate tint levels for the tintable window(s) and sends instructions to transition the tintable window(s). The calculations in the control logic are run 1 to n times at intervals timed by the timer at step 610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass can take up to 30 minutes or more. For these large windows, calculations may be done on a less frequent basis such as every 30 minutes. Although Modules A, B, and C are used in the illustrated embodiment, one or more other logic modules can be used in other embodiments.

At step 620, logic Modules A, B, and C perform calculations to determine a tint level for each electrochromic window 505 at a single instant in time $t_i$. These calculations can be performed by the window controller 450, or by a site monitoring system. In certain embodiments, the control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At step 630, the control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic to ensure that all windows have a particularly high level of tinting. Another example of an override may be if there is no occupant in the room, for example, over a weekend in a commercial office building. In these cases, the building may disengage one or more Modules that relate to occupant comfort. In another example, an override may be that all the windows may have a high level of tinting in cold weather or all the windows may have a low level of tinting in warm weather.

At step 650, instructions with the tint levels are transmitted over a site network to window controller(s) in communication with electrochromic device(s) in one or more tintable windows 505 in the building. In certain embodiments, the transmission of tint levels to all window controllers of a building may be implemented with efficiency in mind. For example, if the recalculation of tint level suggests that no change in tint from the current tint level is required, then there is no transmission of instructions with an updated tint level. As another example, the building may be divided into zones based on window size. The control logic may calculate a single tint level for each zone. The control logic may recalculate tint levels for zones with smaller windows more frequently than for zones with larger windows.

In some embodiments, the logic in FIG. 6 for implementing the control methods for multiple tintable windows 505 in an entire site can be on a single device, for example, a single master window controller. This device can perform the calculations for each and every window in the site and also provide an interface for transmitting tint levels to one or more electrochromic devices in individual tintable windows 505.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The control logic may receive information about these instances and change the control logic to change the tint level to the override value at that time of day.

User Interface

Figure 7:
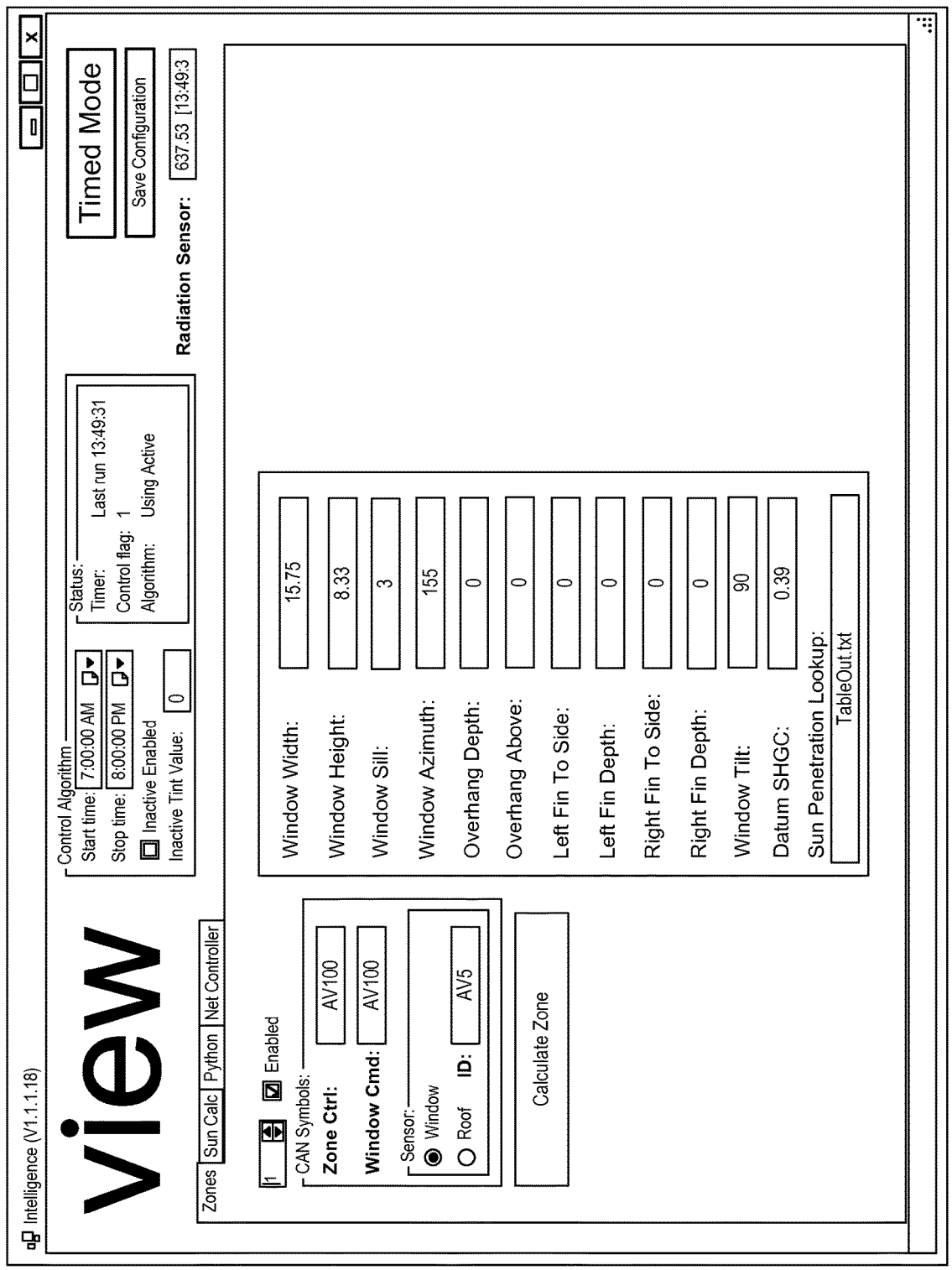
FIG. 7 is an illustration of an example of a user interface that can be used to enter schedule information to generate a schedule employed by a window controller.

The portion of the control logic employed by window controller may also include a user interface, in certain cases, in electronic communication with a master scheduler. An example of a user interface 1405 is shown in FIG. 7. In this illustrated example, the user interface 1405 is in the form of a table for entering schedule information used to generate or change a schedule employed by a master scheduler. For example, the user can enter the time period into the table by entering start and stop times. The user can also select a sensor used by a program. The user can also enter Site data and Zone/Group Data. The user can also select an occupancy lookup table to be used by selecting "Sun Penetration Lookup."

User interface 1504 is in electronic communication with a processor (e.g., microprocessor) and/or in electronic communication with a computer readable medium (CRM). The processor is in communication with the CRM. The processor is a component of the window controller 1110. The CRM may be a component of the window controller 1110 or may be a component of the BMS or site monitoring system. The logic in the master scheduler and other components of the control logic may be stored on the CRM of the window controller 1110, the BMS, or the site monitoring system User interface 1504 may include an input device such as, for example, a keypad, touchpad, keyboard, etc. User interface 1504 may also include a display to output information about the schedule and provide selectable options for setting up the schedule.

A user may input their schedule information to prepare a schedule (generate a new schedule or modify an existing schedule) using the user interface 1504.

A user may enter their site data and zone/group data using user interface 1504. Site data 1506 includes the latitude, longitude, and GMT Offset for the location of the site. Zone/group data includes the position, dimension (e.g., window width, window height, sill width, etc.), orientation (e.g., window tilt), external shading (e.g., overhang depth, overhang location above window, left/right fin to side dimension, left/right fin depth, etc.), datum glass SHGC, and occupancy lookup table for the one or more tintable windows in each zone of the site. In certain cases, site data and/or zone/group data is static information (i.e. information that is not changed by components of the predictive control logic). In other embodiments, this data may be generated on the fly. Site data and zone/group data may be stored on the CRM of the window controller 1110 or on other memory.

When preparing (or modifying) the schedule, the user selects the control program that a master scheduler will run at different time periods in each of the zones of a site. In some cases, the user may be able to select from multiple control programs. In one such case, the user may prepare a schedule by selecting a control program from a list of all control programs (e.g., menu) displayed on user interface 1405. In other cases, the user may have limited options available to them from a list of all control programs. For example, the user may have only paid for the use of two control programs. In this example, the user would only be able to select one of the two control programs paid for by the user.

EXAMPLES

A Site Monitoring System

FIG. 8 shows an example of a dashboard for site monitoring system. The depicted view includes a row for each of multiple sites monitored by the system, with each row including a site name, its current status, and a most recent update time. The status row indicates whether or not all monitored devices and controllers in the site appear to be functioning properly. A green light may be used to indicate no problems, a red light may be used to indicate that a problem exists, and a yellow light may be used to indicate that a device or controller is trending toward a problem. One field of the view provides a link to details about the site. Thus, if the dashboard shows that there may be a problem at the site, the user can obtain pull up event logs, sensor output, window electrical responses, etc. for the site. This allows the user to drill down quickly to the precise issue while still having a high-level picture of any sites that have issues.

Figure 9:
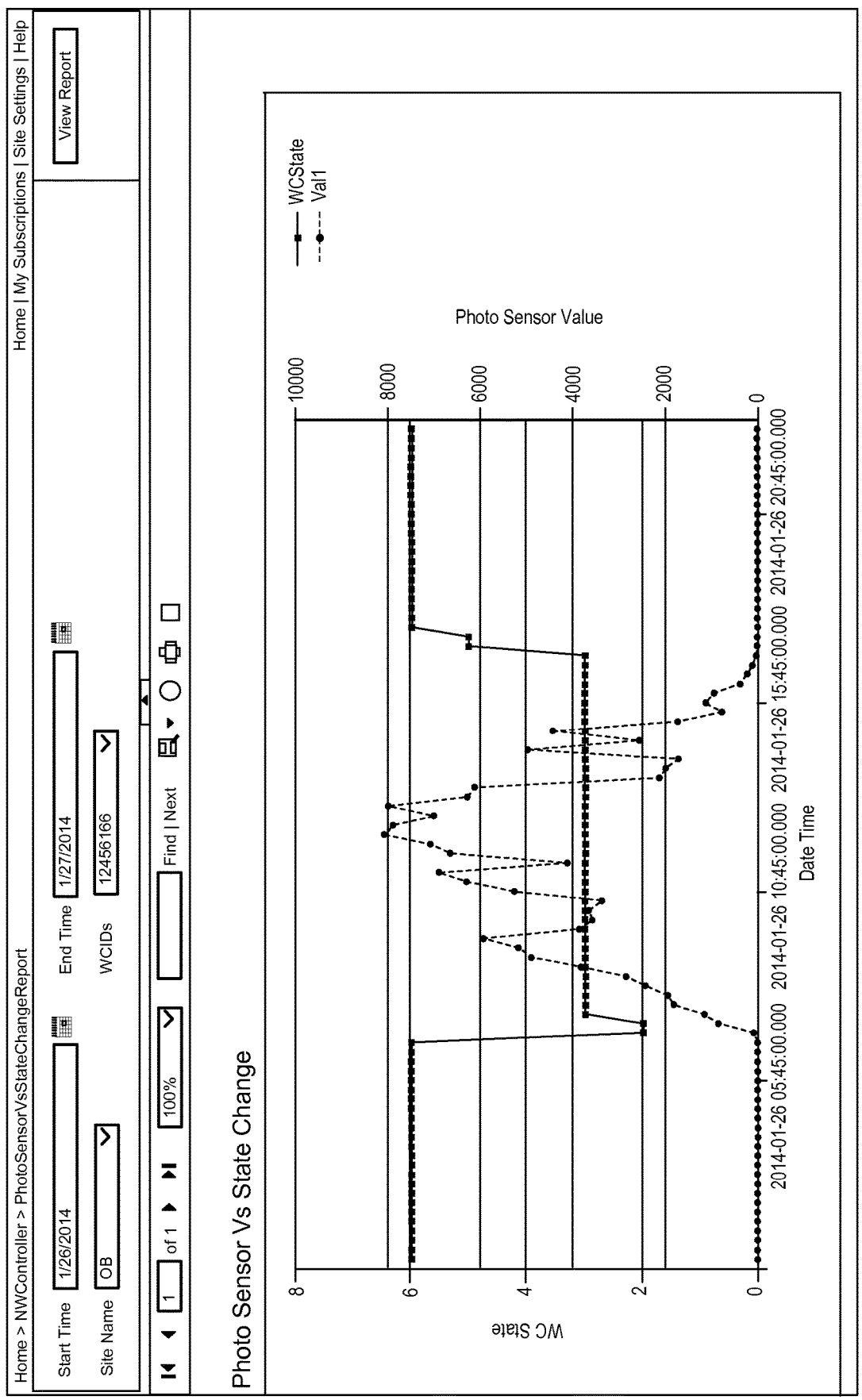
FIG. 9 presents an example of photosensor data that may be obtained by a site monitoring system.

FIG. 9 presents an example of one type of site information that may be obtained by a site monitoring system. The graph presents the output signal from a photosensor over time. This information is presented with the tint state of a window that is controlled using information from the sensor. As illustrated, the window tint state reasonably corresponds with the sensor output.

Figure 10:
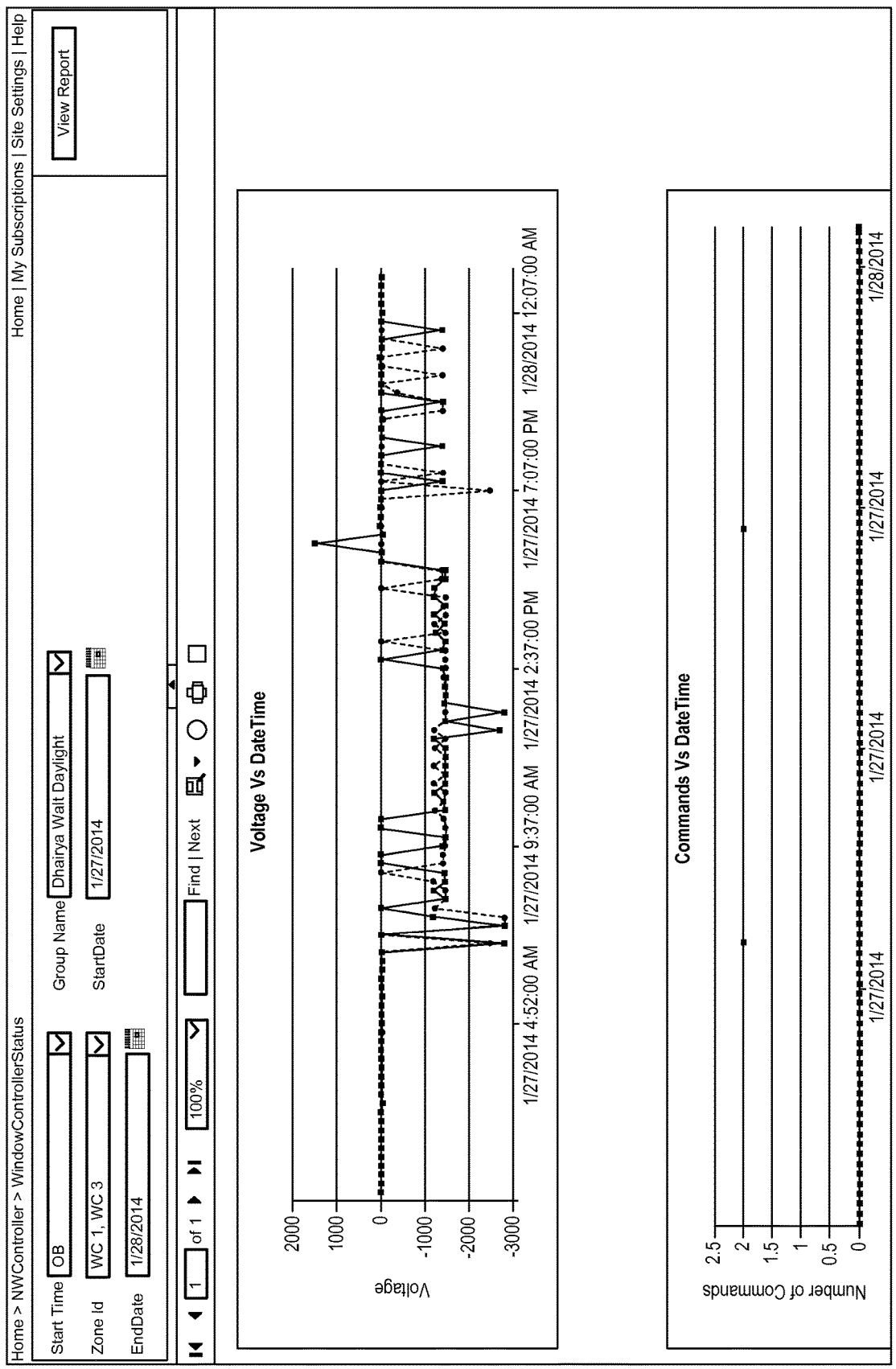
FIG. 10 presents data showing a window's response is shown in relation to commands issued by a controller for the window. This is another example of site information that may be obtained by a monitoring system.

FIG. 10 presents another example of site information that may be obtained by a monitoring system. In this case, a window's response is shown in relation to commands issued by a controller for the window.

Figure 11:
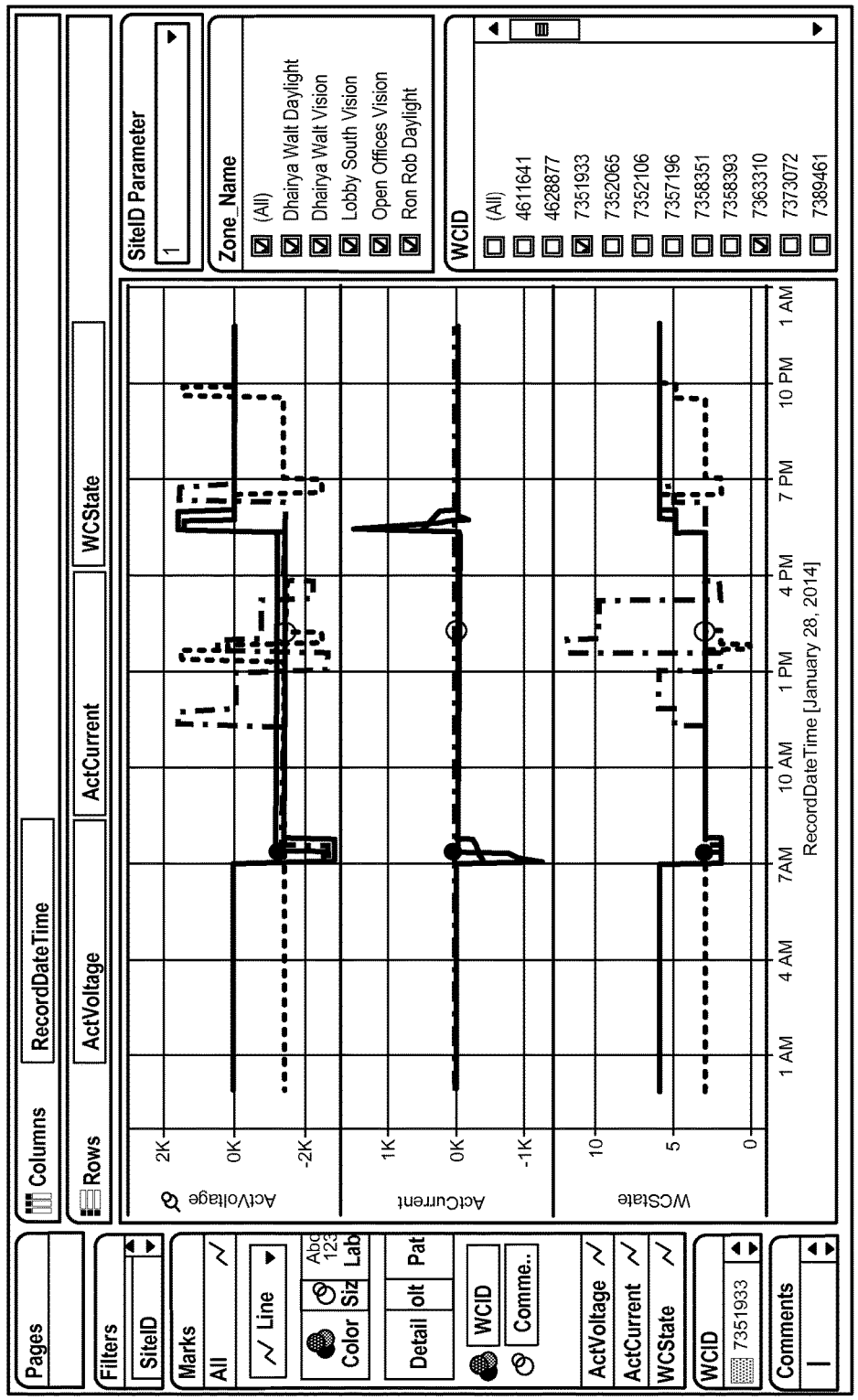
FIG. 11 shows state transitions of windows controlled by three different network controllers in a site. This is yet another example of site information that can be monitored and stored.

FIG. 11 shows yet another example of site information that can be monitored and stored. This example shows state transitions of windows (using current, voltage, and controller commands) controlled by three different network controllers in a site. If the transitions of one of the windows are inconsistent with expected behavior, it may indicate a problem with the associated network controller.

Figure 12:
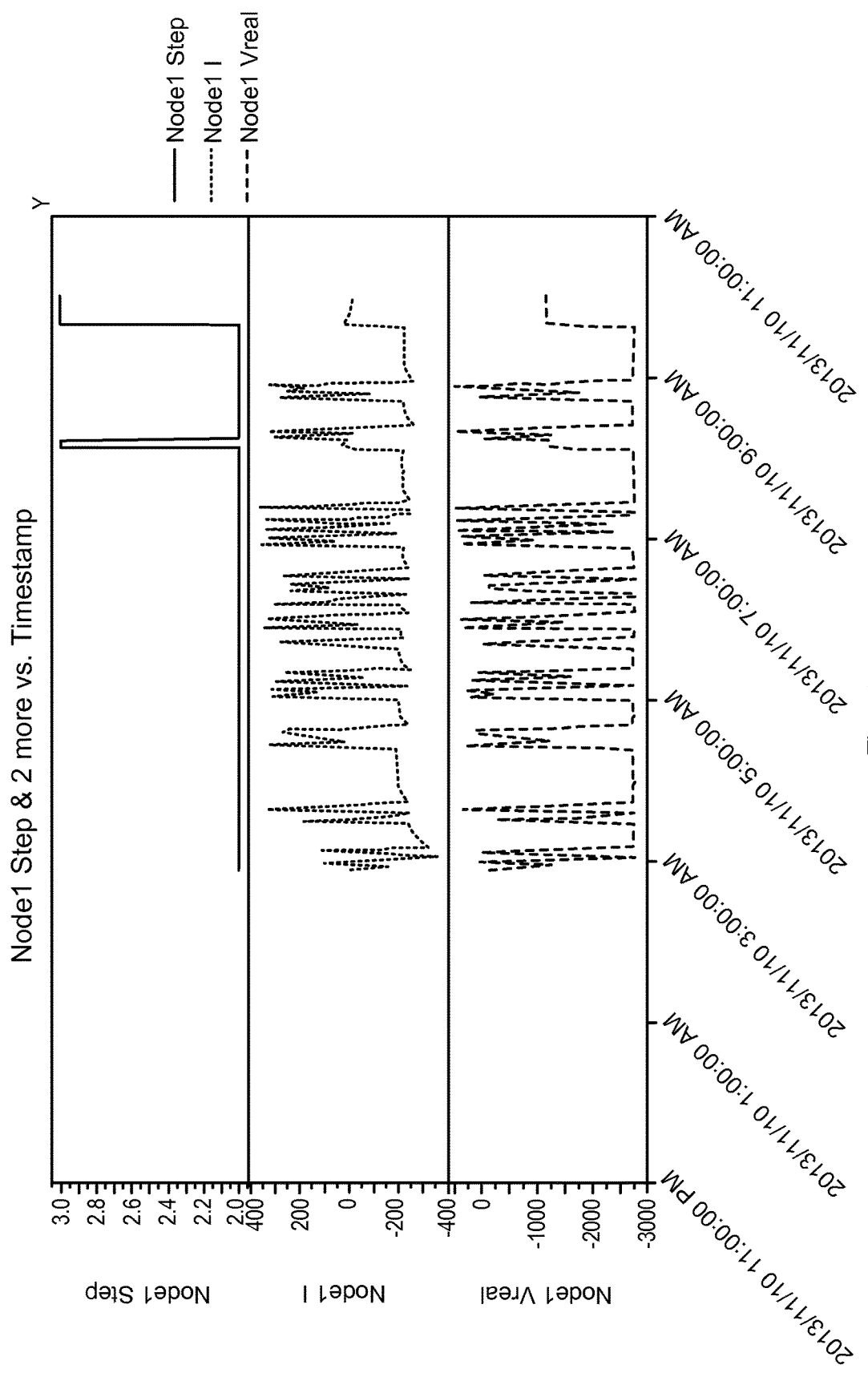
FIG. 12 shows site monitored data illustrating the case when a multiple tinting is required to switch a device from one optical state to another.

FIG. 12 illustrates the case when multiple tinting operations are required to switch a device from one optical state to another. See case 1g above. Each unsuccessful attempt to switch a device (whether successful or not) impacts the lifetime of device. The lower trace represents the voltage to the window and the middle trace represents the current to the window. In a properly executed transition, the applied voltage will settle to a hold voltage of about −1200 mV. Clearly, this is not the case with the monitored window under consideration, a situation that may be flagged by the site monitoring system. In certain embodiments, the system includes an autodiagnostic function that notes attempts to double tint and double clear, situations that may result in early failure.

Figure 13:
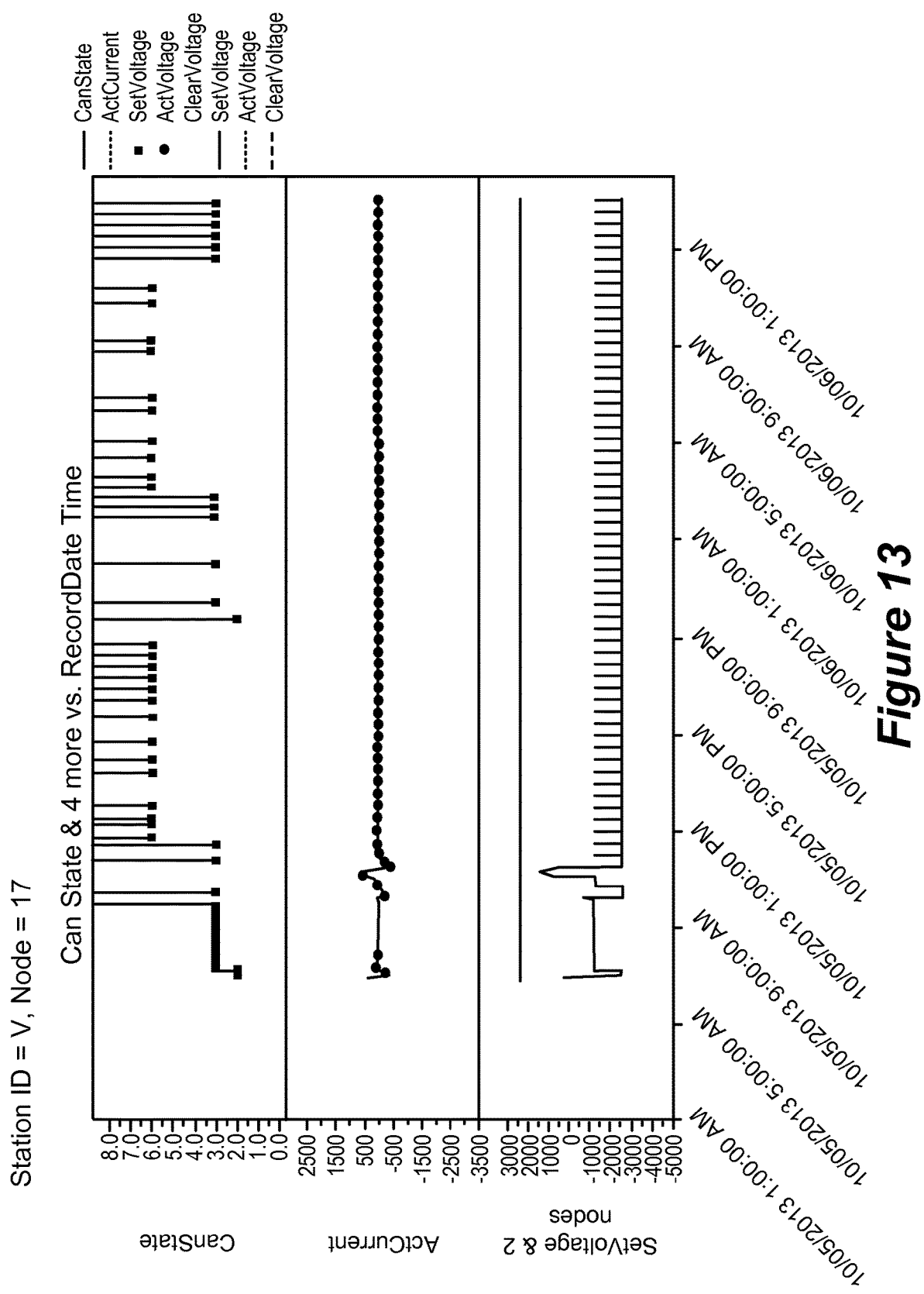
FIG. 13 shows site monitored data indicating degradation in the connection of a power line to a integrated glass unit.

FIG. 13 presents an example of monitored data that may be used to diagnose a potential problem with an electrical connector to a window or controller, possibly through a window frame or IGU. See monitoring case 3b above. As mentioned, a "pigtail" is sometimes used to connect wiring from a power source to the window. In some cases, the connecter connects directly to a controller. The information contained in FIG. 13 shows that a constant command was issued by a high level controller (e.g., a master network controller). See the flat line, third from the top. However the window controller's applied voltage and current (lower and upper traces) show rapid and significant changes, which may be diagnosed as a problem with the connection. In response, personnel can be instructed to check the connection and replace it if necessary.

Figure 14A:
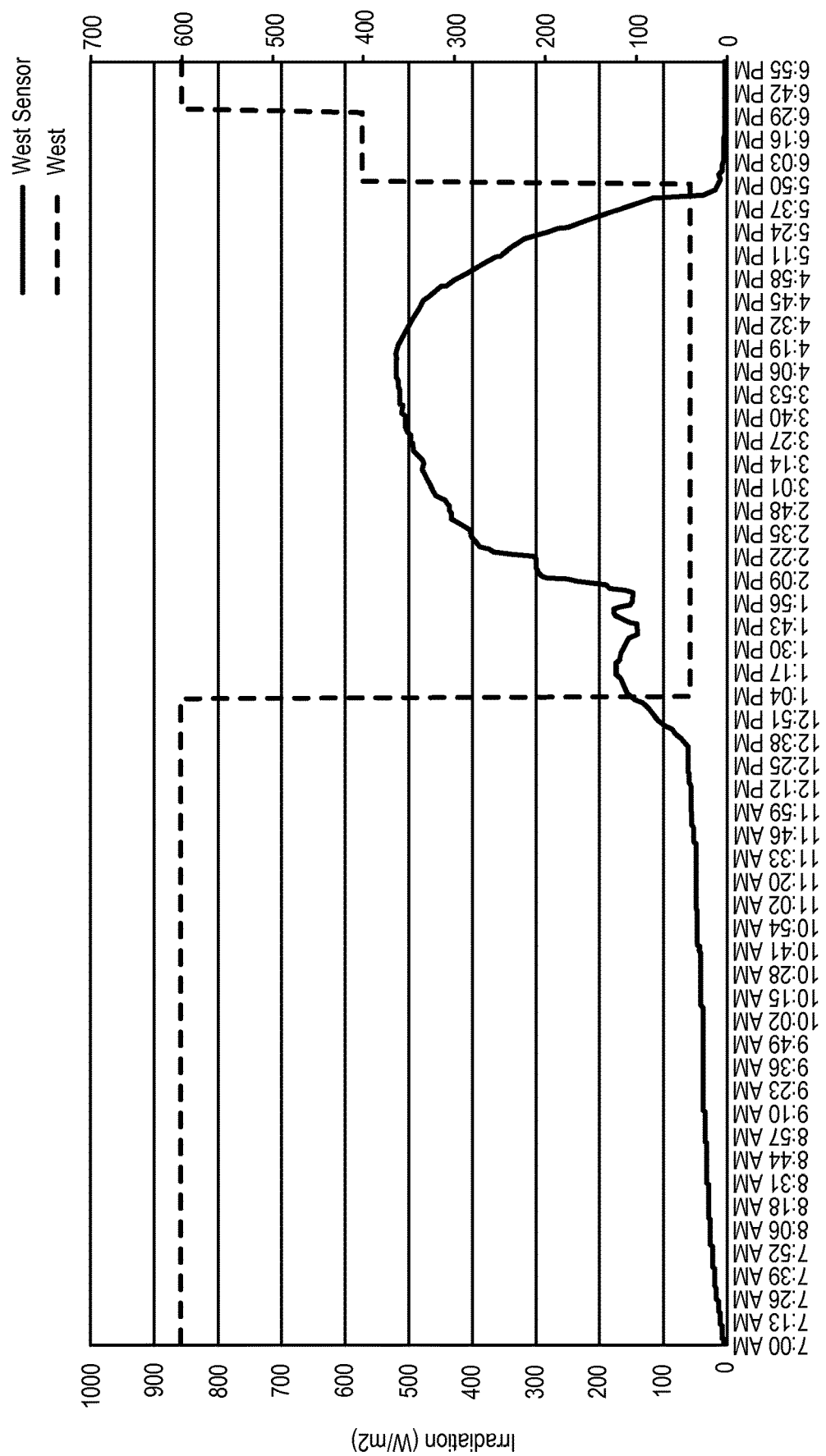
FIGS. 14A-D show site monitored data comparing zone state changes that may be used by the monitoring system to ensure that the control logic is working properly.
Figure 14B:
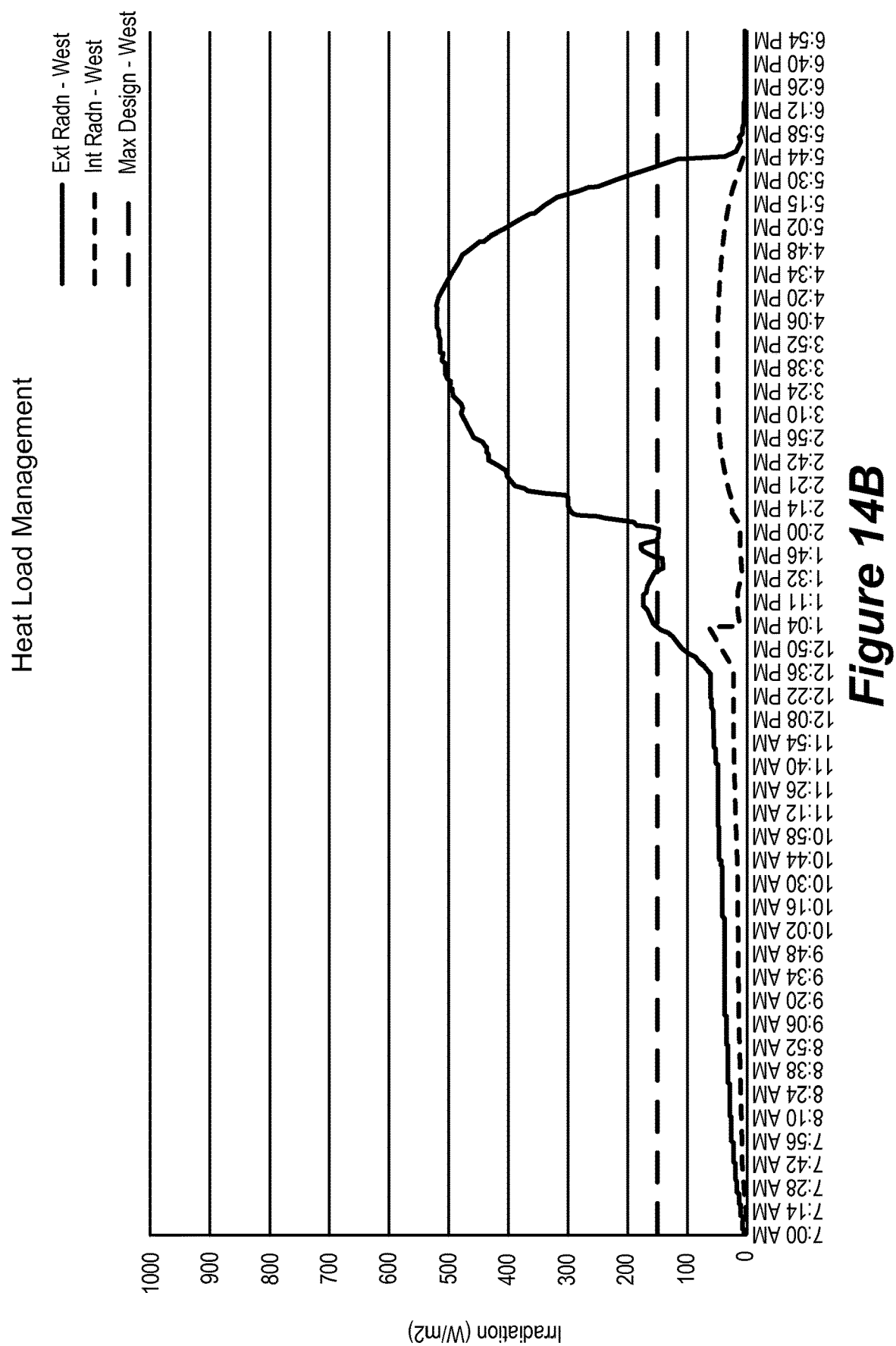
Figure 14C:
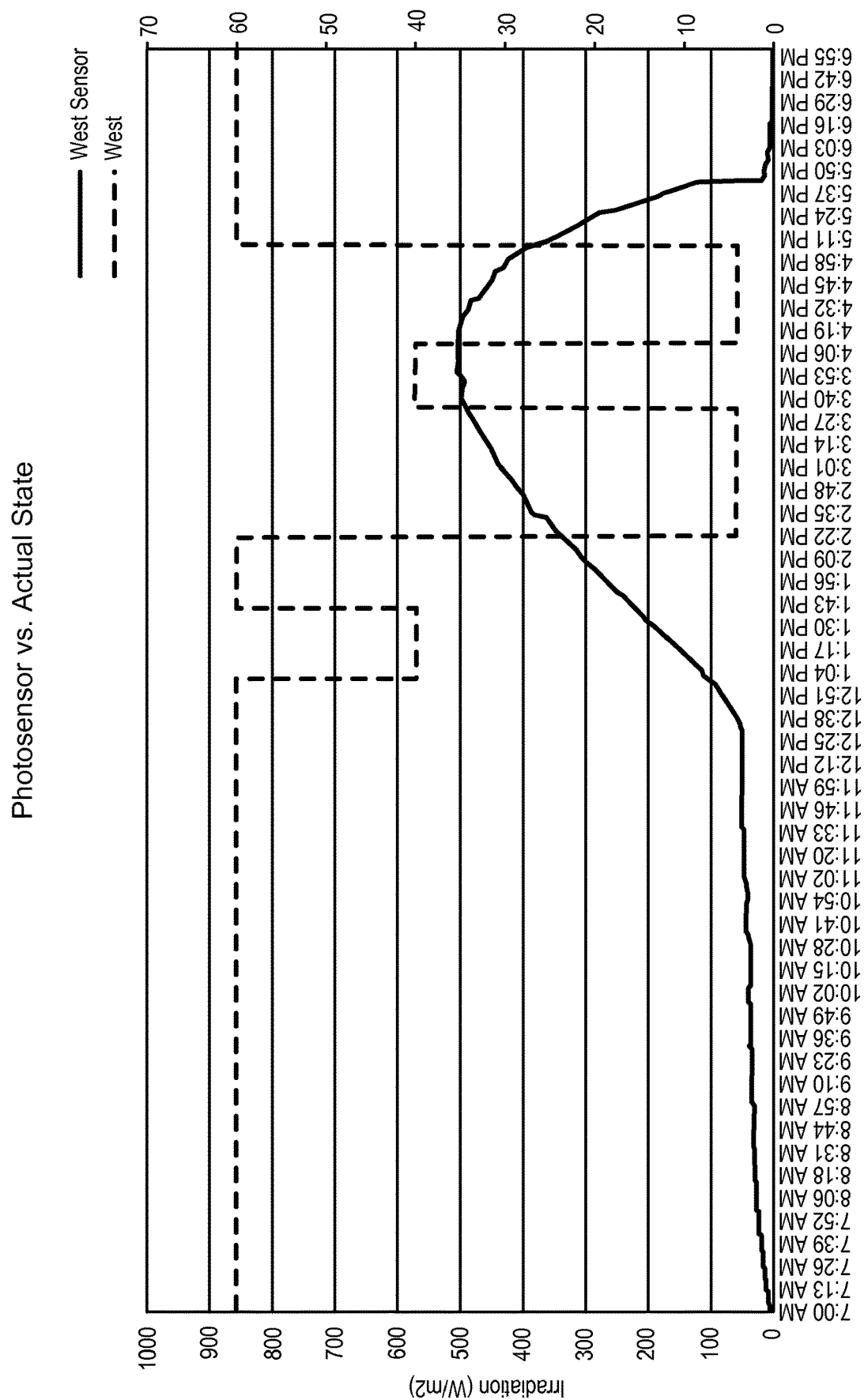
Figure 14D:
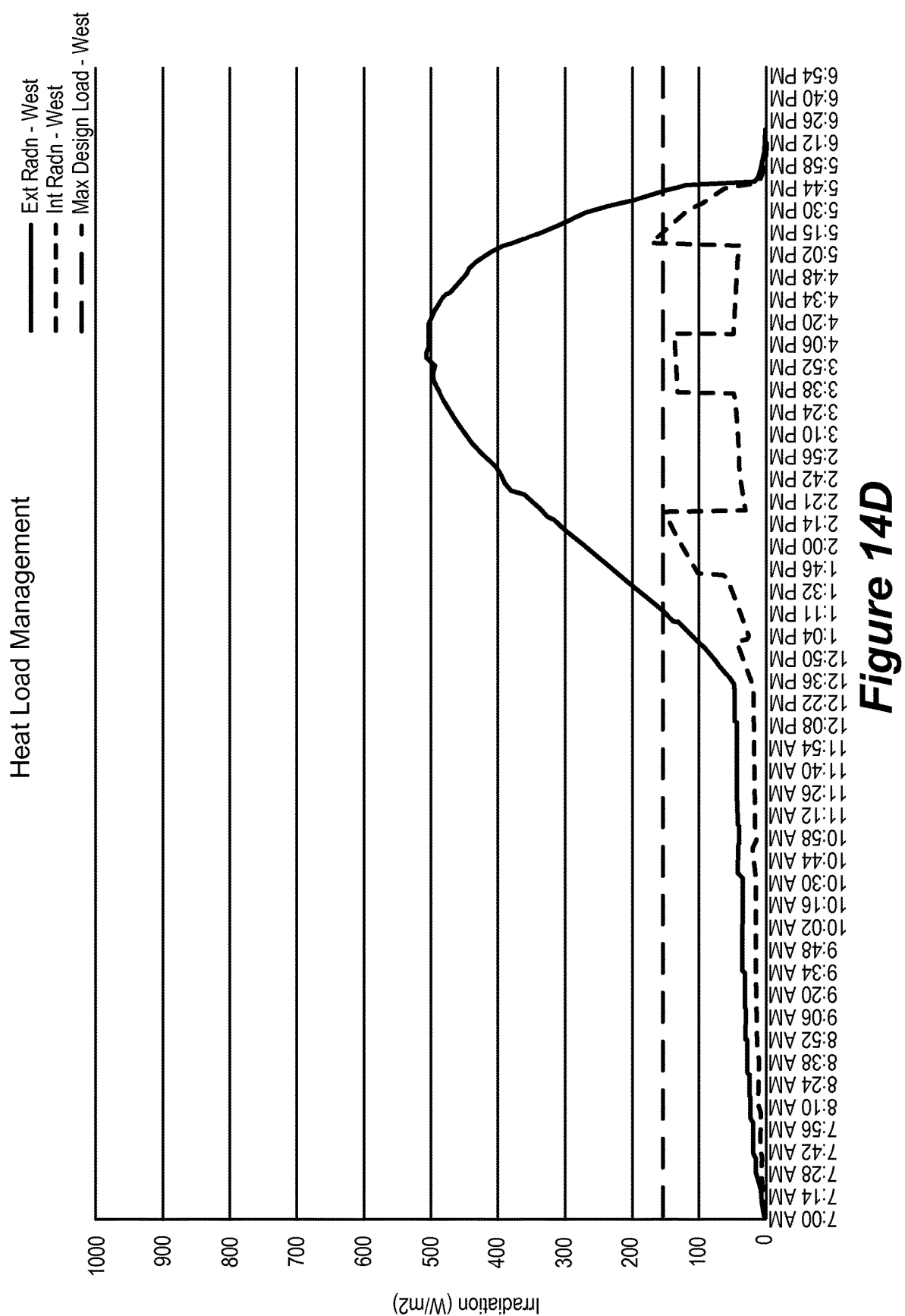

FIGS. 14A-D illustrate monitored information relating solar radiation (as detected by photo detector on the site exterior) to window tinting and heat load. FIGS. 14A and 14C illustrate monitored data for a properly functioning controller and window, while FIGS. 14B and 14D illustrate data for an improperly functioning controller and/or window. In FIG. 14A, the darker curve represents irradiance (W/m2) over time as detected by the photo detector, while the lighter more linear plot represents the tinting state of a window facing the same direction as the photo detector. As expected for a properly functioning tinting algorithm, the window tints when the solar irradiance increases. By contrast, the tinting shown in FIG. 14C does not follow an expected path; it drops to a high transmissivity state during maximum solar exposure. This situation may be automatically detected and flagged by the site monitoring system. The system may include further logic for determining whether this otherwise problematic situation is actually acceptable due to, e.g., a common override for the subject window or controller at the site. If such override is identified, the monitoring site may conclude that no problem exists and/or that it should change the tinting algorithm to capture the override.

FIG. 14B illustrates the radiative heat load through a window (or group of windows) at the site as a function as a function of time. The upper curve represents the radiative heat flux (W/m2) that the building would receive if no tinting was applied. The lower dashed curve represents the actual radiative heat load at the site when the window(s) in question is tinted according to the properly functioning algorithm as depicted in FIG. 14A. The flat middle dashed line represents a designed maximum radiative heat load that may be associated with a standard window type (e.g., static tinted glass or low E glass). As shown in FIG. 14B, the actual radiative heat load is well below both the no-tint heat load and the designed heat load. In this situation, the site monitoring system will not flag a problem. It may, however, calculate and optionally save or present the quantity of energy saved using the switchably tinting windows. Energy can be calculated from the area under the curves. The difference between the area under the upper solid curve (no tinting) and the lower dashed curve (controlled tinting) corresponds to the energy saved using controlled tinting in the site under consideration. Similarly, the difference between the area under the middle dashed line (design heat load) and the lower dashed curve (controlled tinting) corresponds to the energy saved in comparison to a standard static approach to managing radiant heat flux.

FIG. 14D illustrates the heat load as in FIG. 14B but for the potentially problem tinting reflected in FIG. 14C. In this case, the heat load temporarily exceeds the design heat load, but stays well below the heat load that would result from no tinting. Over time, this window/controller still saves energy in comparison to the design heat load.

Figure 15:
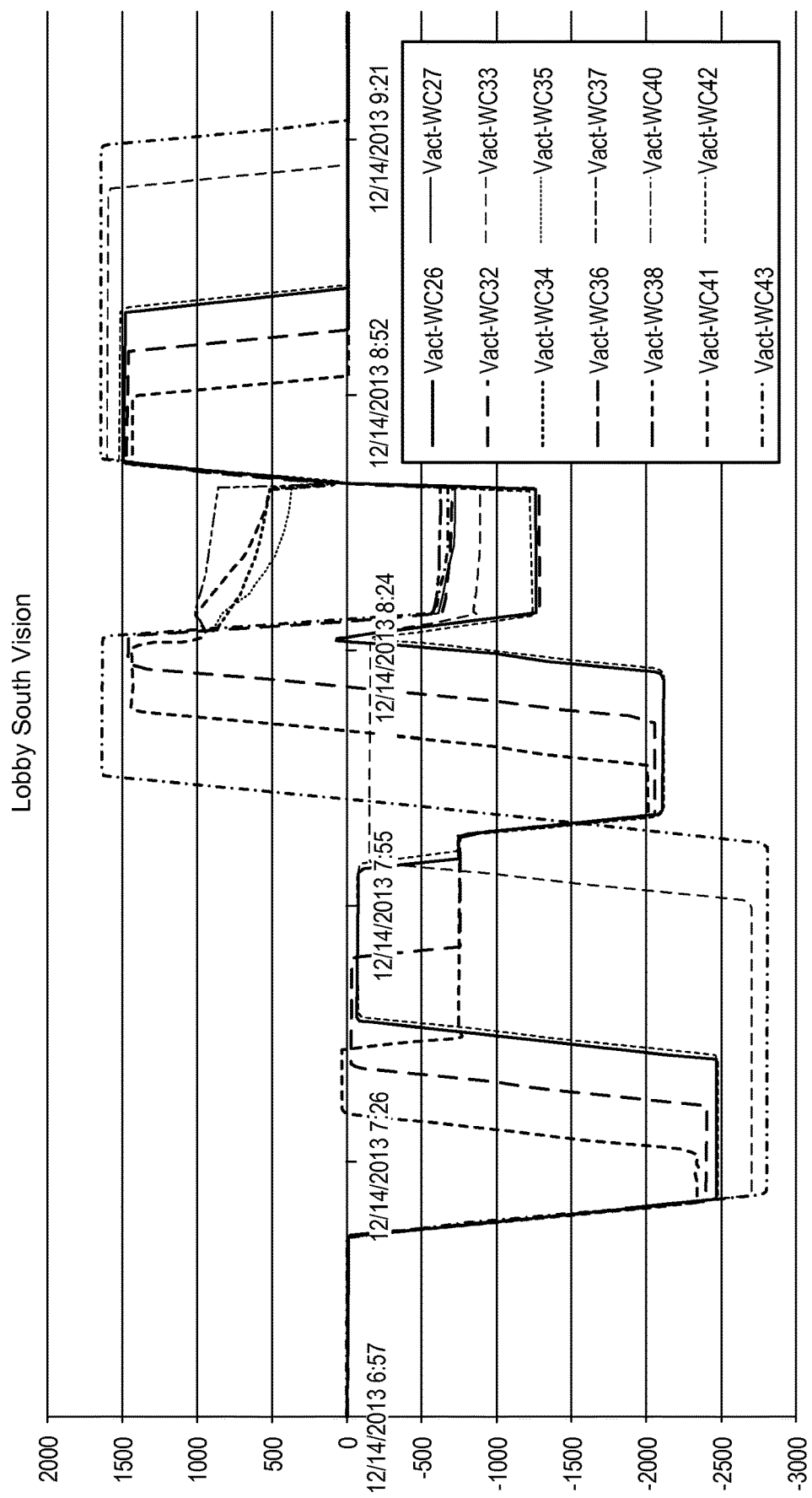
FIG. 15 illustrates monitored data for multiple windows from the same zone but having different switching characteristics.

FIG. 15 illustrates monitored data for multiple windows having different switching characteristics and possibly having different sizes. Each trace in the figure represents the switching voltage over time for a different window. As shown, different windows exhibit different switching times; the lowest V trace is for a window having the longest switching time. In the depicted example, the different windows are part of the same bank or zone and consequently should transition at the same or similar rates. When the monitoring system receives data as shown in FIG. 15 it can automatically determine that the switching times vary widely and possibly well out of specification. This may trigger an adjustment in the switching algorithm for some or all of the windows; the algorithm may be changed to slow the transition rate of fast switching windows and/or increase the rate of slow switching windows.

Figure 16:
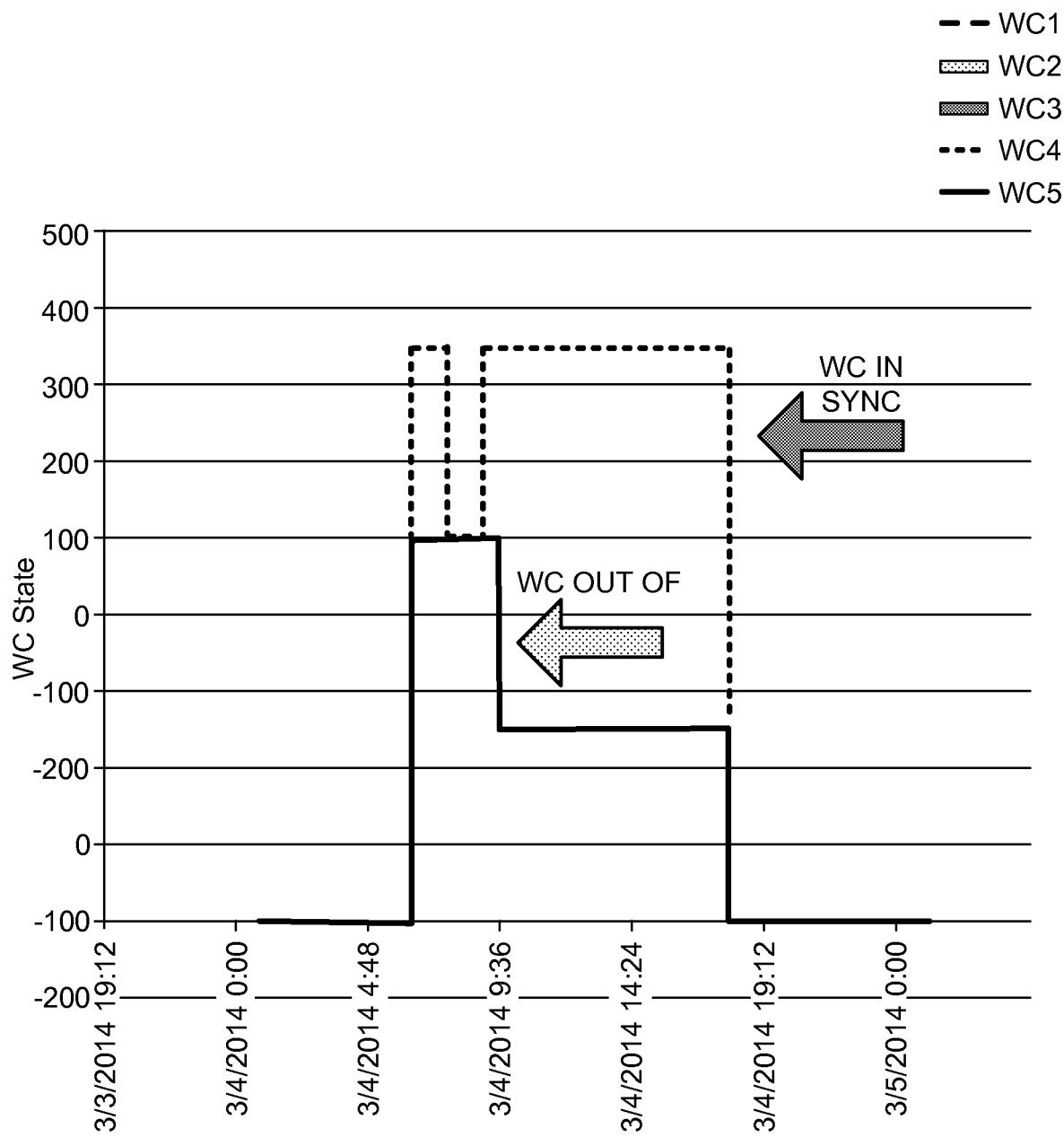
FIG. 16 illustrates monitor information showing that a zone under consideration has one of the controllers is out of sync with rest of the controllers in the zone.

FIG. 16 provides monitor information showing that the zone under consideration has a potential problem or error because one of the controllers is out of sync with rest of the controllers in the zone. With such information, the monitoring system or personnel accessing the system can further investigate the problem to isolate the controller, its connections, a window it controls, etc.

Figure 17:
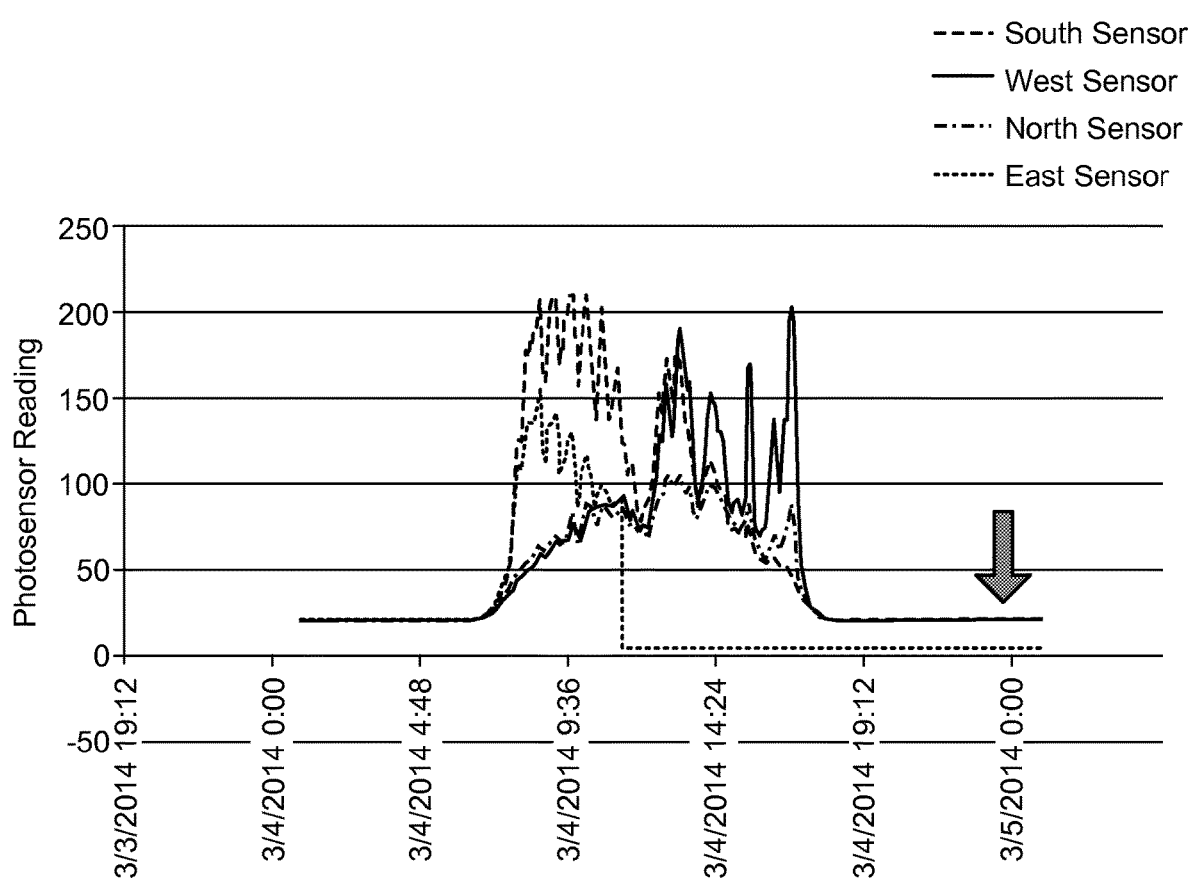
FIG. 17 provides monitor information for four photosensors, each facing a different direction, on a site.

FIG. 17 provides monitor information for four photosensors, each facing a different direction, on a site. The East sensor has stopped working as shown by its output value dropping to near zero and then not changing at all. Because the other sensors are still reading and the time is early in the afternoon, the system can eliminate the possibility that no light is hitting the site exterior, which could also lead to the very low reading. The monitoring system may conclude that the East photosensor has failed.

FIGS. 18A-I present an example of field degradation and detection using features 1.a, 1.b and 1.f from the "Data Monitored" section: changes in peak current, changes in hold (leakage) current, and comparison with other window controllers on the same façade with identical loads. In this example, window controllers WC1-WC11 have similar loads (two integrated glass units/controller) and they control windows on same façade. Controller WC12 is on same façade but has half the load (1 IG/controller). Stored information on the controllers is provided in the graph of FIG. 18A, where W, H, and SF are the windows' widths, heights, and square feet (area). The system expects that controllers WC1-WC11 will have the same drive and hold current profiles.

Figure 18B:
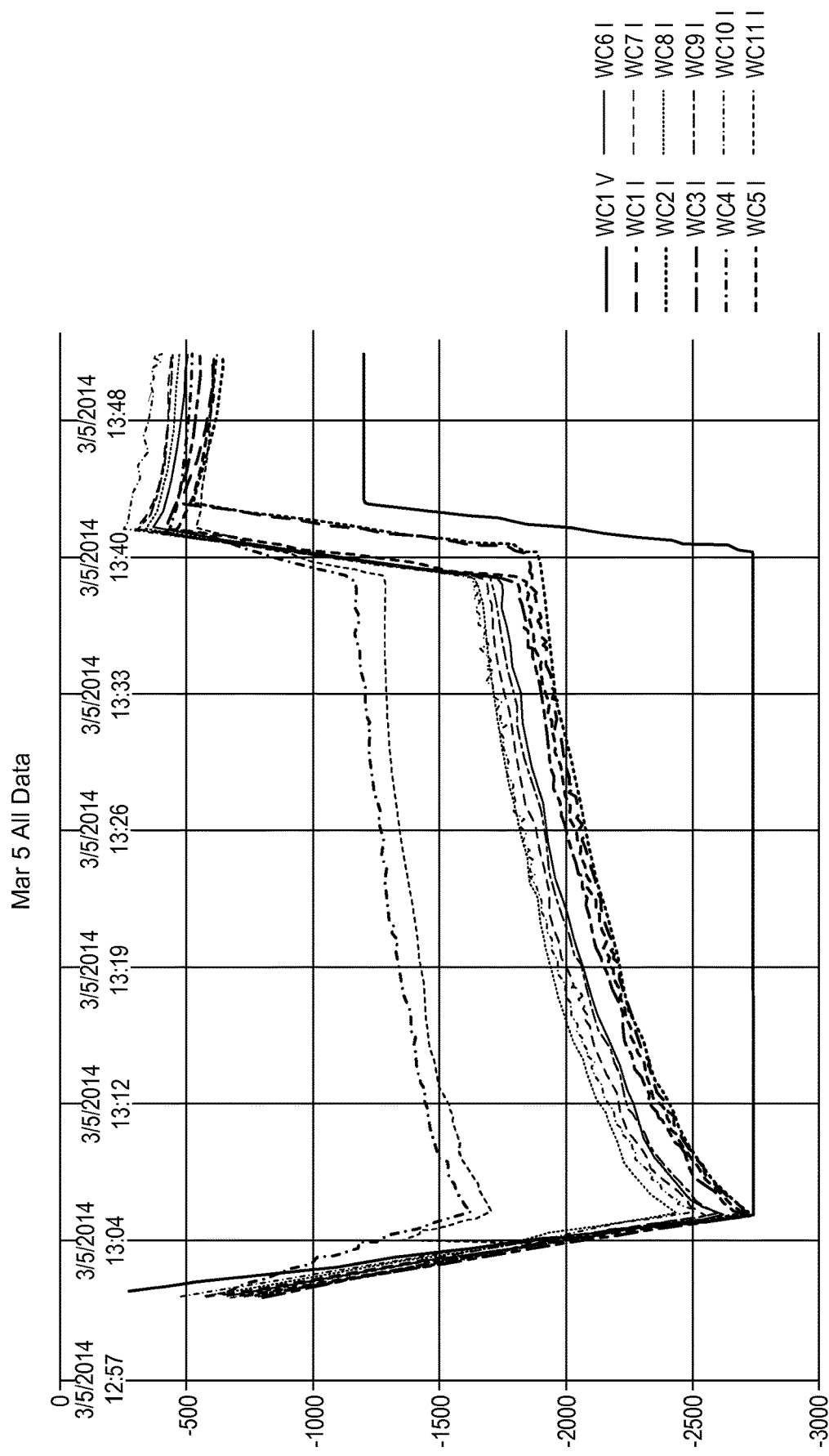
Figure 18C:
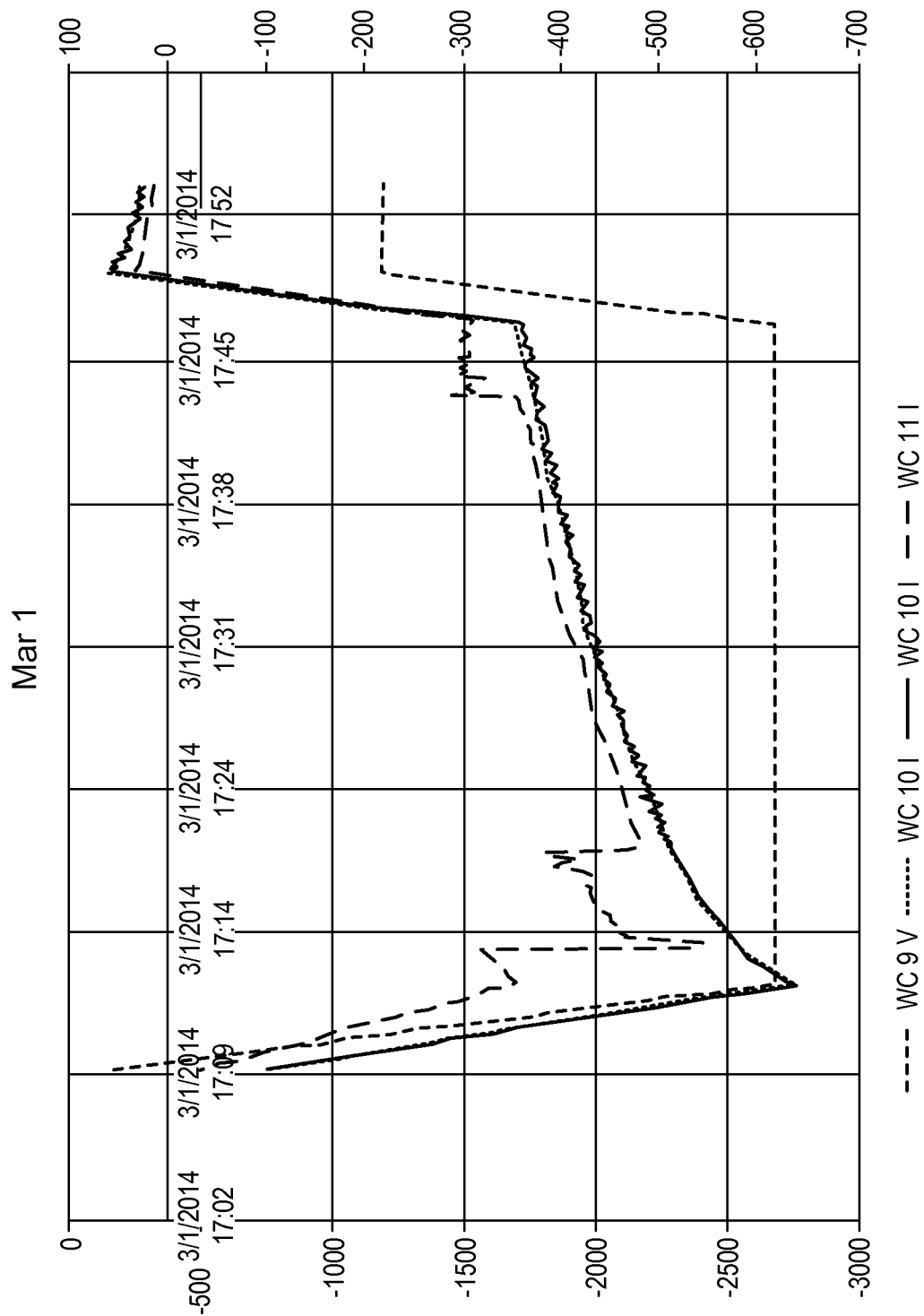
Figure 18D:
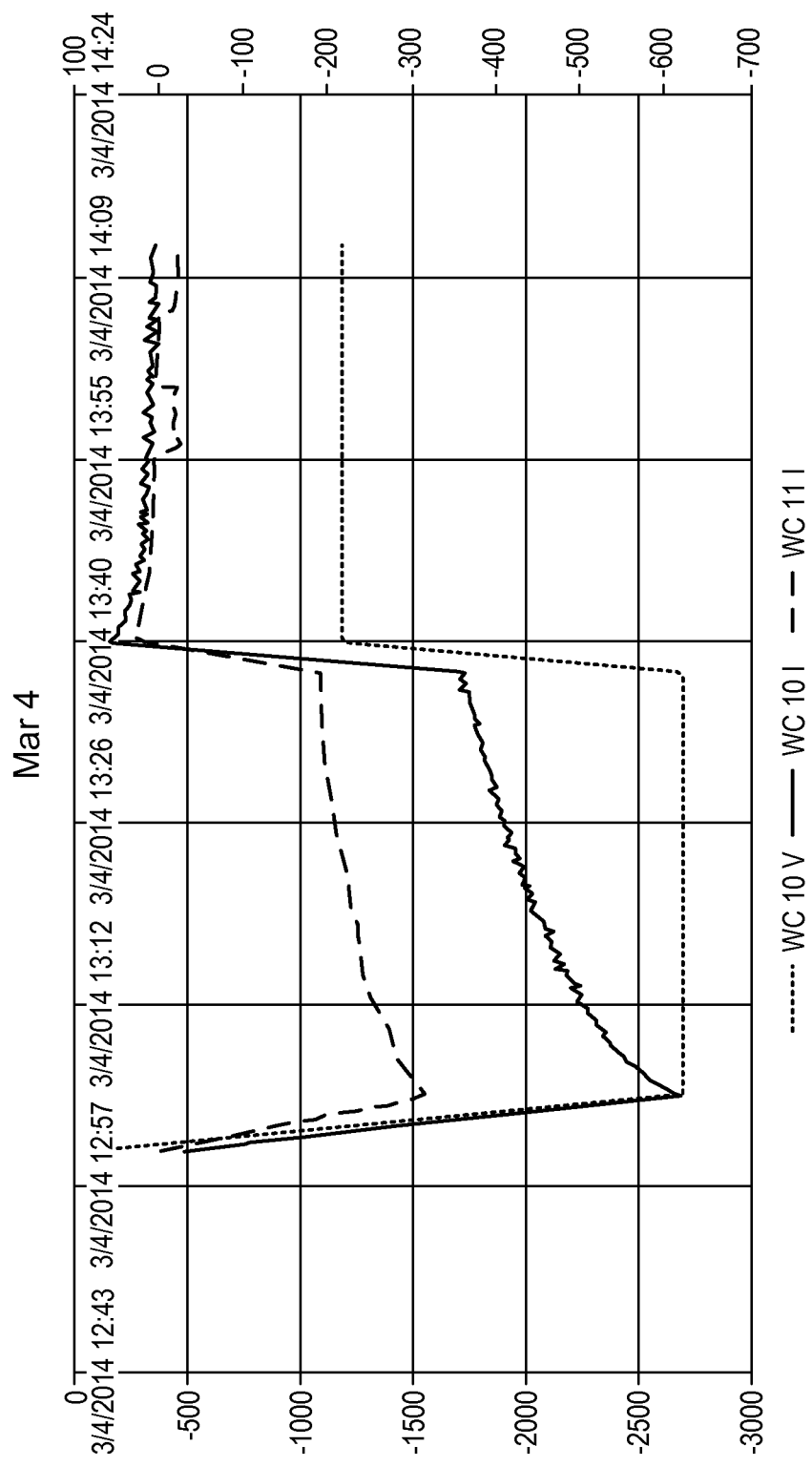
Figure 18E:
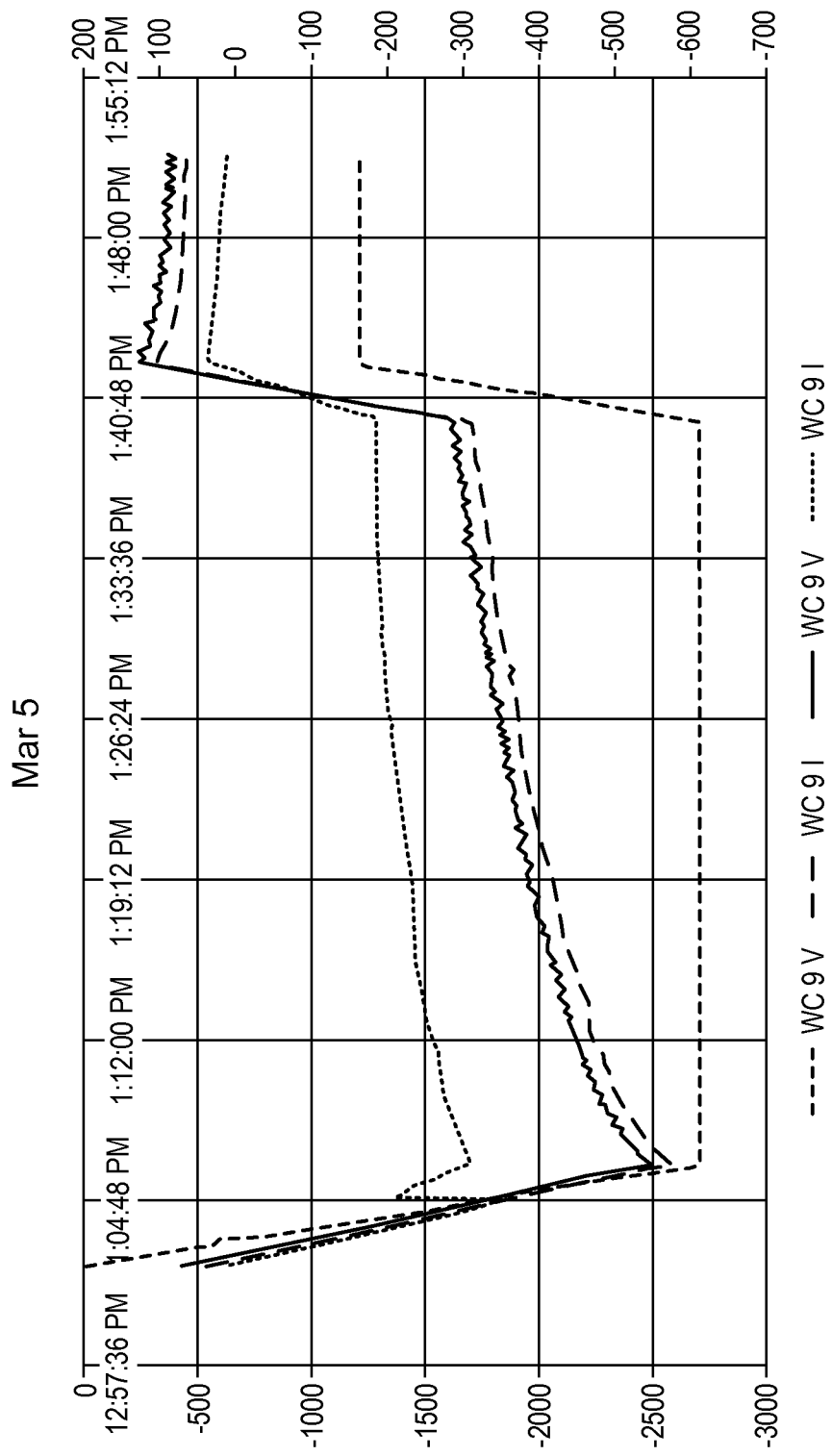
Figure 18F:
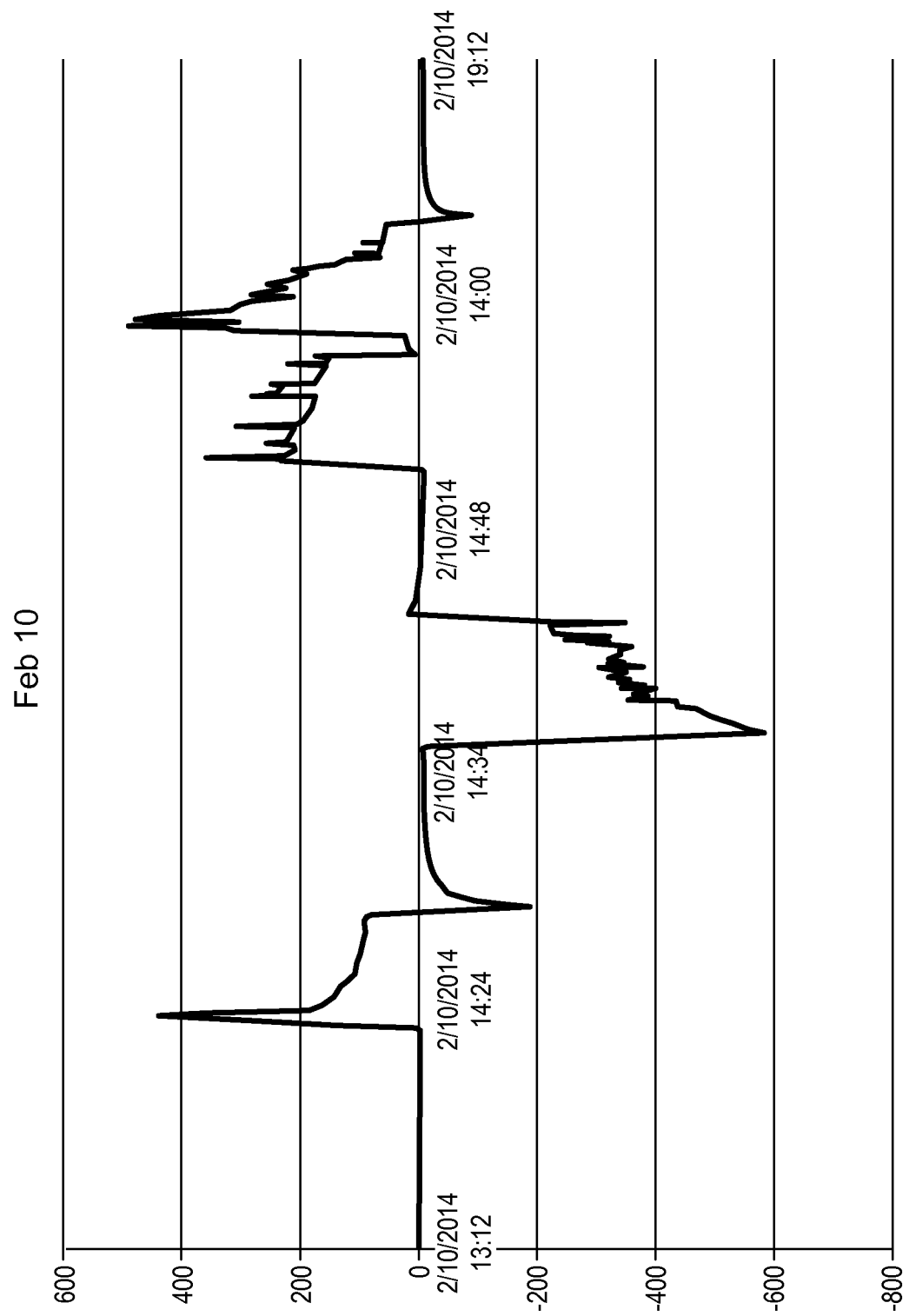
Figure 18G:
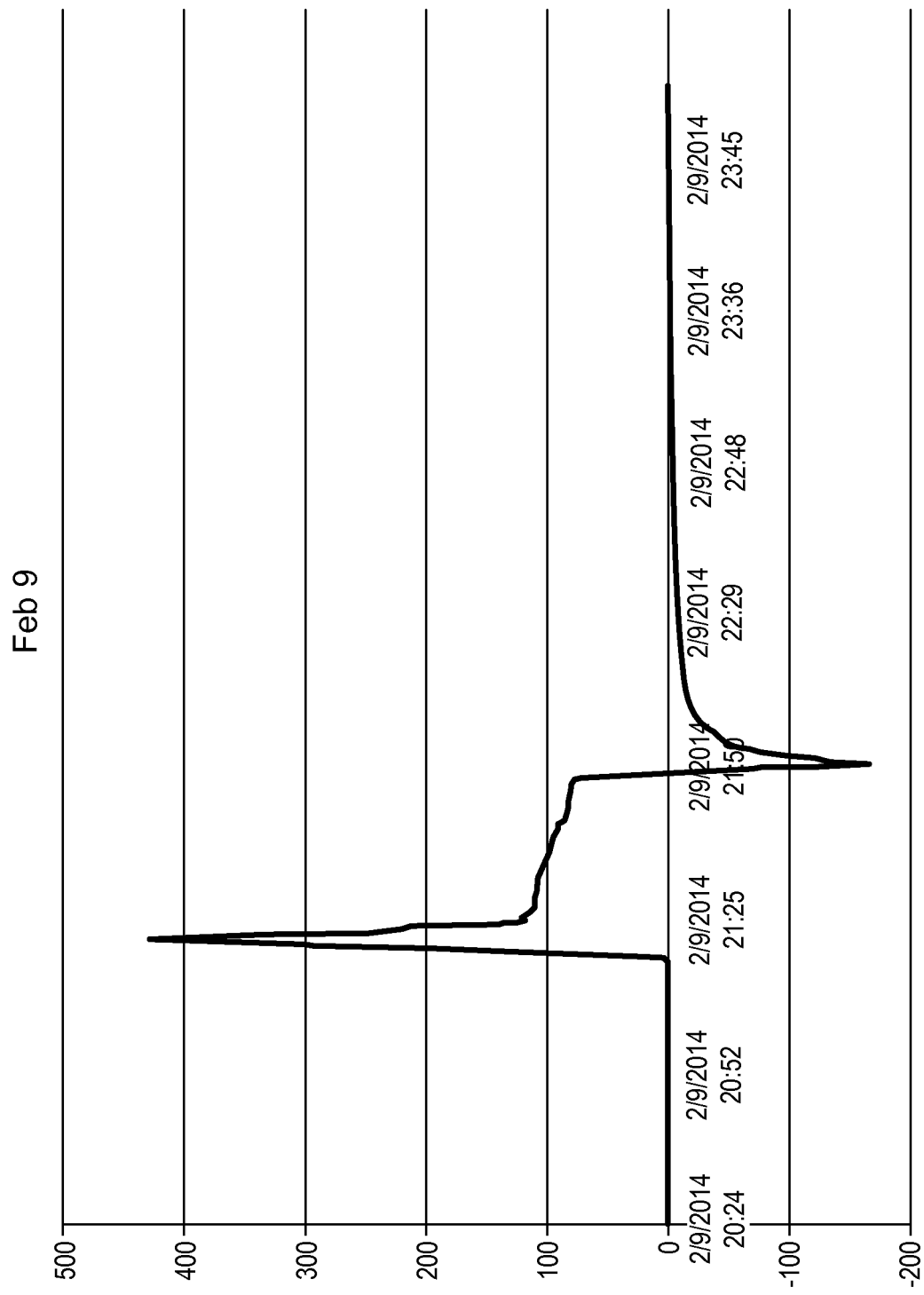
Figure 18H:
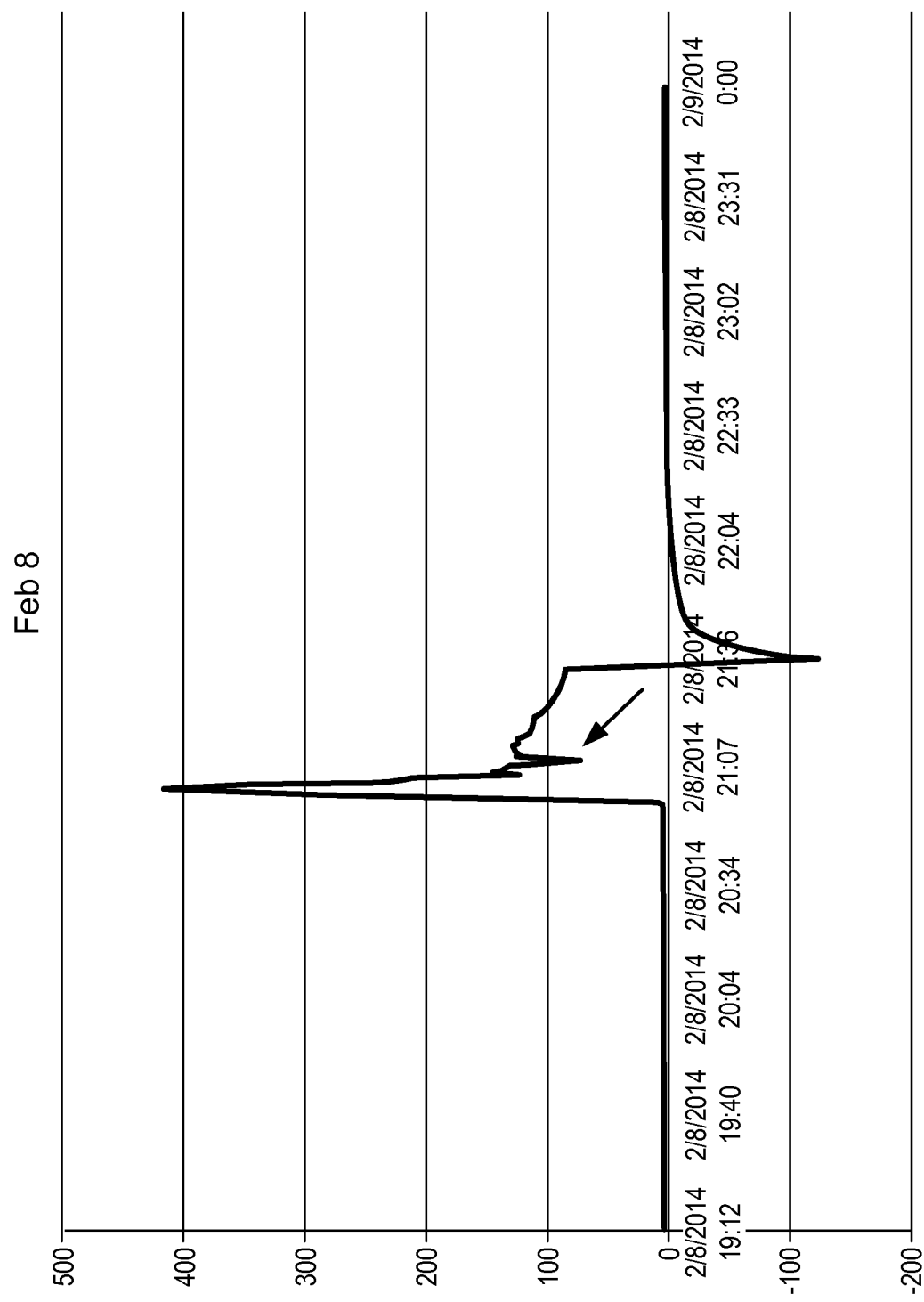

In FIGS. 18B-E, which present plots of controller current readings taken on March 1, 4, and 5, the lower flat bottomed curve is the applied voltage to drive a window transition. See the labels WC1V for March 5, WC09V for March 1, WC10V for March 4, and WC9V for March 5 (FIG. 18E). As seen, the applied voltage profile is the same; all controllers are identically driven. All other curves represent current from the controllers, and all controllers except WC12 have identical loads. Hence, the system expects the current curves for WC1-WC11 to be same for same. The site monitoring system analyzes and compares the current currents, and finds that WC11 has two issues (a) its current profile has an uncharacteristic dip in it in the middle of a ramp (b) it draws about half the peak current (about as much as WC12 level) compared to WC1-WC10, suggesting that one of the two windows controlled by WC11 was not getting tinted. Manual inspection of the windows confirmed found one window controlled by WC11 was not tinting properly. Further inspection showed that one window of two controlled by WC11 was not tinting due to pinched cable which ultimately stopped working, which is why WC11 had an uncharacteristic current profile that eventually resembled WC12 which drives a single window.

Analysis of WC11 from earlier dates (February 8-10 in the graphs FIGS. 18F-H) shows that it had characteristics of a failing controller. Current drawn from WC11 had spiky drops and increases in current evidencing onset of the problem. With auto detection, the site monitoring system could have found this problem and flagged it to field service before one of the windows stopped tinting and became a noticeable problem.

Mechanical Shades

While certain disclosure emphasizes systems, methods, and logic for controlling switchable optical devices (e.g., electrochromic devices), these techniques can also be used to control mechanical shades or a combination of switchable optical devices and mechanical shades. Such a mechanical shade may, for example, include a motor operated blind or an array of microelectromechanical systems (MEMS) devices or other electromechanical systems (EMS) devices. Windows having a combination of electrochromic devices and EMS systems devices can be found in PCT international application PCT/US2013/07208, titled "MULTI-PANE WINDOWS INCLUDING ELECTROCHROMIC DEVICES AND ELECTROMECHANICAL SYSTEMS DEVICES," filed on Nov. 26, 2012, which is hereby incorporated by reference in its entirety. Mechanical shades typically have different power requirements than certain switchable optical devices such as electrochromic devices. For example, while certain electrochromic devices require a few volts to operate, mechanical shades may in some instances require larger voltages in order to establish sufficient potential to physically move the mechanical feature.

Microblinds and microshutters are examples of types of EMS devices. Some examples of microblinds and microshutters, and their methods of fabrication are described respectively in U.S. Pat. Nos. 7,684,105 and 5,579,149, both of which are hereby incorporated by reference in their entirety.

In certain embodiments, a mechanical shade may be an array of EMS devices, where each EMS device including a portion (e.g., a hinge or an anchor) attached to the substrate and a mobile portion. When actuated by electrostatic forces, the mobile portion may move and obscure the substrate. In the unactuated state, the mobile portion may expose the substrate. In the example of some microblinds, the mobile portion may be an overhanging portion of a material layer that curls when actuated by electrostatic forces. In the example of some microshutters, the mobile portion can rotate or curl when actuated. In some cases, the EMS devices may be actuated and controlled by electrostatic control means. In the example of microshutters, the electrostatic control means may control the angle of rotation or curl to different states. The substrate with the array of EMS devices may also include a conductive layer. In the example of microblinds, the microblinds are fabricated using a thin layer(s) under controlled stress. In embodiments with an array of EMS devices, each EMS device has two states, an actuated state and an unactuated state. The actuated state may render the array of EMS devices substantially opaque and the unactuated state may render the array of EMS devices substantially transparent, or vice versa. The actuated and unactuated states may also switch between substantially reflective (or absorptive) and substantially transparent, for example. Other states are also possible when the array of EMS devices is in an actuated or unactuated state. For example, microshutters, a type of MEMS device, may be fabricated from a tinted (but non-opaque) coating, which when shut provide a tinted pane, and when open the tint is substantially removed. Further, some arrays of EMS devices may have three, four, or more states that are able to be transitioned to. In some cases, the EMS devices can modify visible and/or infrared transmission. The EMS devices may reflect in some cases, may be absorptive in other cases, and in yet other embodiments may provide both reflective and absorptive properties. In certain embodiments, the EMS devices may be operated at variable speeds, e.g., to transition from a high transmission state to a low-transmission state, or a no-transmission state. In certain cases, the EMS devices may be used in conjunction with an electrochromic device (or other switchable optical device) as a temporary light blocking measure, e.g., to block light until the associated electrochromic device has transitioned to a lower transmissivity state or a higher transmissivity state.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims. For example, while the various features of the site monitoring devices have been described individually, such features may be combined in a single site monitoring device.

What is claimed is:

1. A site monitoring system, the system comprising:
   (a) a processing device including one or more interfaces, wherein the interfaces are configured to:
      be communicatively coupled with a plurality of remote sites, each remote site of the plurality of remote sites including (i) a network of respective switchable optical devices, (ii) associated controllers and (iii) associated sensors; and
      receive data from the plurality of remote sites about functioning of the network;
   (b) a data repository configured to store the received data and
   (c) logic configured to cause the processing device to:
      (I) in response to the received data, identify any of (i) the switchable optical devices, (ii) the associated controllers, and (iii) the associated sensors, that are performing outside of an expected performance region; and
      (II) send data and/or control messages, over the one or more interfaces, to at least one of (i) the switchable optical devices, (ii) the associated controllers and (iii) the associated sensors, in response to the received data.

2. The system of claim 1, wherein the logic is further configured to cause the processing device to generate a notification that the switchable optical devices, associated controllers, and/or associated senosors identified are performing outside their expected performance region.

3. The system of claim 1, wherein the -logic is further configured to cause the processing device to:
   (i) determine a corrective action to bring one or more of the switchable optical devices, associated controllers, and/or associated sensors identified, into their expected performance region; and
   (ii) communicate the corrective action to a remote site that includes the one or more of the: switchable optical devices, associated controllers, and/or associated sensors identified.

4. The system of claim 3, wherein the corrective action comprises modifying an algorithm for controlling the one or more of the switchable optical devices identified.

5. The system of claim 1, wherein the logic is further configured to cause the processing device to:
   (i) learn a preference of a user by identifying consistent interactions of the user with one or more of the switchable optical devices at a respective remote site; and
   (ii) adjust procedures for controlling the one or more of the switchable optical devices to meet the preference of the user.

6. The system of claim 1, further comprising a dashboard configured to flag remote sites that have identified switchable optical devices, associated controllers, and/or associated sensors operating outside their expected performance region.

7. The system of claim 1, wherein the logic is further configured to cause the processing device to:
   (i) determine a degradation in electrical current of one or more of the switchable optical devices; and
   (ii) auto-correct the degradation by directing a controller associated with the one or more of the switchable optical devices to increase a voltage to the one or more of the switchable optical devices.

8. The system of claim 1, wherein the logic is further configured to cause the processing device to:
   (i) predict when a room at a remote site is to be occupied; and
   (ii) automatically adjust a tint algorithm for one or more of the switchable optical devices in the room to start tinting the one or more of the switchable optical devices, when the room is predicted to be occupied.

9. The system of claim 1, wherein the logic is further configured to cause the processing device to:
   (i) detect a difference in tinting times and/or tinting levels for different switchable optical devices at a respective remote site; and
   (ii) cause the different switchable optical devices to tint at the same time and/or to the same tint level, by auto adjusting ramping voltage parameters.

10. The system of claim 1, wherein the logic is further configured to cause the processing device to provide look ahead data to a remotes site's HVAC system and/or lighting system to thereby enable the HVAC system or lighting system to enhance occupant comfort and/or save energy at the remote site, which HVAC system is a heating, ventilation, and/or air conditioning system.

11. The system of claim 1, wherein the logic is further configured to cause the processing device to compare energy usage at multiple remotes sites, and to identify algorithms and/or device types that improve the energy usage.

12. The system of claim 1, wherein the logic is further configured cause the processing device to:
    (i) generate fingerprints of the switchable optical devices, controllers, and/or sensors of the plurality of remote sites during commissioning of the remote sites; and
    (ii) determine performance of the switchable optical devices, controllers, and/or sensors by comparing the fingerprints.

13. The system of claim 1, wherein the remote sites comprise residential buildings, office buildings, schools, airports, hospitals, or government buildings.

14. The system of claim 1, wherein the data about functioning of the networks comprises changes in peak current to the switchable optical devices, changes in leakage current to the switchable optical devices, changes in voltage compensation to the switchable optical devices, and changes in power consumption of the switchable optical devices.

15. A method, implemented on a site monitoring system, the method comprising:
    (a) receiving data from a plurality of remote sites with a processing device communicatively coupled to the remote sites, each remote site including a network of switchable optical devices, associated controllers, and associated sensors, to identify any of the switchable optical devices, the associated controllers, and the associated sensors, that are performing outside an expected performance region, and
    (b) sending data and/or control messages, in response to the data received, to at least one of (i) the switchable optical devices, (ii) the associated controllers, and (iii) the associated sensors.

16. The method of claim 15, further comprising generating a notification that at least one of (i) the switchable optical devices, (ii) the associated controllers and/or (iii) the associated sensors identified is performing outside its expected performance region.

17. The method of claim 15, further comprising:
(c) determining a corrective action to bring one or more of (i) the switchable optical devices, (ii) the associated controllers and/or (iii) the associated sensors identified into its expected performance region; and
(d) communicating the corrective action to a remote site having the at least one of (i) the switchable optical devices, (ii) the associated controllers, and/or (iii) the associated sensors identified.

18. The method of claim 17, wherein the corrective action comprises modifying an algorithm for controlling the one or more of the identified switchable optical devices.

19. The method of claim 15, further comprising:
(c) learning a preference of a user by identifying consistent interactions of the user with one or more of the switchable optical devices; and
(d) adjusting procedures for controlling the one or more switchable optical devices to meet the preference of the user.

20. The method of claim 15, further comprising:
(c) determining degradation in electrical current to one or more of the switchable optical devices; and
(d) auto-correcting the degradation by directing a controller associated with the one or more switchable optical devices to increase a switching voltage to the one or more switchable optical devices.

21. The method of claim 15, further comprising:
(c) predicting when a room of a remote site is to be occupied; and
(d) automatically adjusting a tint algorithm for a switchable optical device in the room to start tinting when the room is predicted to be occupied.

22. The method of claim 15, further comprising:
(c) detecting a difference in tinting times and/or tinting levels for different switchable optical devices at a respective remote site; and
(d) causing all windows in the different switchable optical devices to tint at the same time and/or to the same tint level, by auto adjusting ramping voltage parameters.

23. The method of claim 15, further comprising providing look ahead data to a remote site's HVAC system and/or lighting system to thereby enable the HVAC or lighting system to enhance occupant comfort and/or save energy at the remote site, which HVAC system is a heating, ventilation, and/or air conditioning system.

24. The method of claim 15, further comprising comparing energy usage at multiple remote sites to identify algorithms and/or device types that improve the energy usage.

25. The method of claim 15, further comprising:
(c) generating fingerprints of (i) the switchable optical devices, (ii) the associated controllers, and/or (iii) the associated sensors of the plurality of remote sites during commissioning of the sites; and
(d) determining performance of (ii) the switchable optical devices, (ii) the associated controllers, and/or (iii) the associated sensors, by comparing their current fingerprints against their earlier fingerprints.

26. The method of claim 15, wherein the remote sites comprise residential buildings, office buildings, schools, airports, hospitals, or government buildings.

27. The method of claim 15, wherein the data comprises (i) changes in peak current to the switchable optical devices, (ii) changes in leakage current to the switchable optical devices, (iii) changes in voltage compensation required to the switchable optical devices, or (iv) changes in power consumption of the switchable optical devices.

28. The method of claim 15, further comprising receiving data from a building management system (BMS), a network controller, and/or a window controller at a remote site.

29. The system of claim 1, wherein the one or more interfaces are configured to receive data from a building management system (BMS), a network controller, and/or a window controller at a remote site.

* * * * *